United States Patent
Janardhanan et al.

(10) Patent No.: US 11,537,670 B2
(45) Date of Patent: Dec. 27, 2022

(54) SYSTEM AND METHOD FOR EVENT DRIVEN GENERATION OF CONTENT

(71) Applicant: OPEN TEXT HOLDINGS, INC., San Mateo, CA (US)

(72) Inventors: Gowtham Janardhanan, Coimbatore (IN); Mohammed Fazil Karni, Bellary (IN); Preetha Srinivasan, Bangalore (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 17/465,473

(22) Filed: Sep. 2, 2021

(65) Prior Publication Data

US 2022/0083607 A1 Mar. 17, 2022

Related U.S. Application Data

(60) Provisional application No. 63/077,794, filed on Sep. 14, 2020.

(51) Int. Cl.
| | |
|---|---|
| *G06F 16/93* | (2019.01) |
| *G06F 16/188* | (2019.01) |
| *G06F 16/11* | (2019.01) |
| *G06F 16/17* | (2019.01) |

(52) U.S. Cl.
CPC ............ *G06F 16/93* (2019.01); *G06F 16/128* (2019.01); *G06F 16/1734* (2019.01); *G06F 16/188* (2019.01)

(58) Field of Classification Search
CPC ...... G06F 16/93; G06F 16/188; G06F 16/128; G06F 16/1734
See application file for complete search history.

(56) References Cited

U.S. PATENT DOCUMENTS

| | | | |
|---|---|---|---|
| 10,037,339 B1* | 7/2018 | Kleinpeter | G06F 16/162 |
| 10,489,498 B2* | 11/2019 | Vinay | G06F 8/38 |
| 10,891,069 B2* | 1/2021 | Ashraf | G06F 3/067 |
| 2011/0153538 A1* | 6/2011 | Jolfaei | G06N 5/025 |
| | | | 706/47 |
| 2013/0219292 A1* | 8/2013 | Vins | G06Q 10/10 |
| | | | 715/751 |
| 2016/0285862 A1* | 9/2016 | Mondal | G06F 16/93 |
| 2017/0116210 A1* | 4/2017 | Park | G06F 11/1471 |
| 2017/0199915 A1* | 7/2017 | McNeill | G06F 16/1873 |
| 2017/0255524 A1* | 9/2017 | McGrath | G06F 11/1451 |
| 2019/0102411 A1* | 4/2019 | Hung | G06N 5/025 |
| 2020/0117705 A1* | 4/2020 | Hance | G06F 16/152 |
| 2020/0319978 A1* | 10/2020 | Smith-Uchida | G06F 11/1469 |

\* cited by examiner

*Primary Examiner* — Robert W Beausoliel, Jr.
*Assistant Examiner* — Susan F Rayyan
(74) *Attorney, Agent, or Firm* — Sprinkle IP Law Group

(57) ABSTRACT

Systems and methods for content management that allow external events or data to drive the generation of content are disclosed. Specifically, disclosed embodiments allow events generated from external sources (or data determined from those events, or otherwise determined) to drive the generation of content (or metadata associated with that content) in a content management system.

24 Claims, 17 Drawing Sheets

| EVENT ID | DOCUMENT ID | EVENT TYPE | DATE | |
|---|---|---|---|---|
| E1 | 0x12344 | NEW | 20/1/2020 | VIEW |
| E2 | 0x12344 | NEW | 20/1/2020 | VIEW |
| E3 | 0x12344 | UPDATE | 20/1/2020 | VIEW |
| E4 | 0x12344 | NEW-UPDATE | 20/1/2020 | VIEW |

D2 Repository > dmadmin > Medical > Alice.pdf opentext™ | Documentum D2

Download

- Alice.pdf — 1.0
  - Blood Report.pdf — 0.1
  - Urinalysis Report... — 0.1
  - Radiology Report... — 0.1
  - Fitness Report.pdf — 0.1
  - X-Ray Report.pdf — 0.1
  - Cardiology Repor... — 0.1

Blood Report.pdf

Properties > | General | Event

Edit

Event

Event Id
110015fa80000101

Event Source
medialab_kafka

Medical Code
RX0001

Title
BT Event 01

Event Time
08/10/2020 12:55:30 AM

Remark
Blood test report from medi lab

FIG. 5C

D2 Repository > dmadmin > Medical > Alice.pdf opentext™ | Documentum D2

Alice.pdf ⌄

Alice.pdf

Download  Edit  •••

> Alice.pdf   0.1
  Blood Report.pdf   0.1
  Urinalysis Report...   0.1
  Radiology Report...   0.1
  Fitness Report.pdf   0.1
  X-Ray Report.pdf   0.1
  Cardiology Repor...   0.1

Properties ⌄

General  Event

Edit

General

Name
Alice.pdf

Subject
No value

Title
No value

Event

Associated Event Ids
110015fa80000101
110015fa80000201
110015fa80000301
110015fa80000401
110015fa80000501
110015fa80000601

FIG. 5D

D2 Repository > dmadmin > Medical > Alice.pdf

Blood Report.pdf

| Properties ∨ | General | Event |

Alice.pdf 1.0
- Blood Report.pdf 0.2
- Urinalysis Report... 0.1
- Radiology Report... 0.1
- Fitness Report.pdf 0.1
- X-Ray Report.pdf 0.1
- Cardiology Repor... 0.1

Event

Event Id
110015fa80000102

Event Source
medialab_kafka

Medical Code
RX0001

Title
BT Event 02

Event Time
08/11/2020 12:55:30 AM

Remark
Blood test report from medi lab

D2 Repository > dmadmin > Medical > Alice.pdf opentext™ | Documentum D2

Download  Edit  •••

- Alice.pdf 1.0
  - Blood Report.pdf 0.2
  - Urinalysis Report... 0.1
  - Radiology Report... 0.1
  - Fitness Report.pdf 0.1
  - X-Ray Report.pdf 0.1
  - Cardiology Repor... 0.1

Blood Report.pdf ⌄

Properties ⌄   General   Event

Edit

Event

Event Id
110015fa80000102

Event Source
medialab_kafka

Medical Code
RX0001

Title
BT Event 02

Event Time
08/11/2020 12:55:30 AM

Remark
Blood test report from medi lab

FIG. 5G opentext™ | Documentum D2

D2 Repository > dmadmin > Medical > Alice.pdf

Alice.pdf ∨

Download  Edit  ...

- Alice.pdf 1.0
  - Blood Report.pdf 0.2
  - Urinalysis Report... 0.1
  - Radiology Report... 0.1
  - Fitness Report.pdf 0.1
  - X-Ray Report.pdf 0.1
  - Cardiology Repor... 0.1

Properties ∨

General  Event

General

Name
Alice.pdf

Subject
No value

Title
No value

Event

Associated Event Ids
110015fa80000102
110015fa80000201
110015fa80000301
110015fa80000401
110015fa80000501
110015fa80000601

Edit

D2 Repository > dmadmin > Medical > Alice.pdf opentext™ | Documentum D2

Blood Report.pdf

Download  Edit  ...

Alice.pdf 1.0

- Blood Report.pdf 0.1
- Urinalysis Report... 0.1
- Radiology Report... 0.1
- Fitness Report.pdf 0.1
- X-Ray Report.pdf 0.1
- Cardiology Repor... 0.1

Properties ›    General    Event    Edit

Event

Event Id
110015fa80000101

Event Source
medialab_kafka

Medical Code
RX0001

Title
BT Event 01

Event Time
08/10/2020 12:55:30 AM

Remark
Blood test report from medi lab

SYSTEM AND METHOD FOR EVENT DRIVEN GENERATION OF CONTENT

RELATED APPLICATION(S)

This application claims a benefit of priority under 35 U.S.C. § 119 from U.S. Provisional Application No. 63/077,794 filed Sep. 14, 2020, entitled "System and Method For Event Driven Generation of Content," which is hereby fully incorporated by reference herein.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of content management. Specifically, the disclosure relates to a system and method to the use of virtual documents in a content management environment. More specifically, embodiments as disclosed relate to event driven generation of content in content management systems and in particular to the event generation of snapshots.

BACKGROUND

Ever since the advent of the computer networks (including the Internet), enterprise environments have been steadily growing more complicated, encompassing an ever-expanding amount of increasingly complex digital content (or just content). Digital content, in essence, is anything that exists in a binary format that may exist in the enterprise environment or otherwise be utilized by the enterprise. The digital content of an enterprise may thus include a variety of digital assets including text, images, aural or video content, templates used in content delivery, objects, or other types of content. For purposes of this disclosure, the terms document and content will be used interchangeably and understood to have the same definition as digital content.

In an enterprise environment, these documents may be widely distributed and used for a wide variety of purposes in association with that enterprise. To aid in managing and using their various documents, many enterprises have employed a number of content management systems (CMS), including, digital asset management (DAM) systems, web content management (WCM) systems, enterprise content management (ECM) systems, etc. CMS do just that, allowing for the management of such content by controlling the access, editing, updating, versioning, etc. of content.

To facilitate content management, content management systems may be organized around one or more content management servers that provide services associated with the management of such content. This type of content management is in no way trivial. In certain contexts, such as in an enterprise setting, there may be millions or even billions documents that need to be managed, and users may desire to have access to these documents from a variety of distributed access points.

It is desired, however that content management systems react to changes in external environments. Specifically, it is desired that content management may create useful content, or manage existing content, based on events that may occur in external environment.

SUMMARY

To continue elaborating on the above referenced desires, as discussed CMS (also referred to herein interchangeably as a document management system) such as OpenText's Documentum™ allow for the management of such content by controlling the access, editing, updating, versioning, etc. of content. To facilitate content management, content management systems may be organized around one or more content management servers that provide services associated with the management of such content. This type of content management is in no way trivial. In certain contexts, such as in an enterprise setting, there may be millions or even billions documents that need to be managed, and users may desire to have access to these documents from a variety of distributed access points.

It is desired, however that content management systems react to changes in external environments. Currently reactive mechanisms are available only to trigger workflows based on external events. As an example, when a new document is created in a CMS a process may be triggered that will automatically move the document into a specific folder. As an example, in current CMS when a change in a document occurs, a user may log into the system and manually upload a new version of the document. However, there is typically no way to see the history of related changes (e.g., with other associated documents) or use events associated with that document to drive the generation of content within the content management system. What is desired is have a reactive mechanism that manages, manipulates, or otherwise generates content (collectively hereinafter manage) content in a CMS.

This is especially problematic with respect to what are referred to as "virtual documents." A virtual document is a document which holds other documents. Thus a virtual document may be a document which acts as a container. A virtual document can contain other virtual documents. The document which acts as a container is called the parent document while the documents which are contained in the parent document are called as child documents. Each of the documents of a parent document may itself be a virtual document so the nesting of such virtual documents may comprise multiple levels.

Accordingly, a virtual document is a document comprised of a set of related documents in the content management system, where each of those related documents may itself have multiple versions and may be independently modified. As such, the virtual document may itself have different version comprised of different child documents (e.g., versions or types of child documents, etc.). In some cases, there may be a schema for each type of virtual document and defines each type of document that may be comprised by the virtual document. The use of such virtual documents allows users to work on individual documents of a virtual document independently while managing the versions of those documents.

In some cases, a snapshot of these virtual document may be desired by a user, where the snapshot allows a user to take or make an archive of a virtual document that captures that state of the virtual document at a moment in time. Usually, this is a manual process entailing that the user initiate the generation of a snapshot. These snapshots may thus be problematic. A user may not know when to take such a snapshot of a virtual documents as important events occurring with respect to that virtual document may be opaque to a user. For example, suppose a virtual document for a medical record for a patient includes multiple documents (e.g., a blood test report and an x-ray). Doctors at two different locations may update these documents. Thus, when one of the documents of the virtual document is updated (e.g., the x-ray), it may be desired to capture a snapshot of the medical record by the doctor associated with the blood test report. This doctor, may, however, be unaware that the x-ray was updated and thus may not know to capture a desired snapshot.

To deal with this, in many cases, snapshots may be taken of virtual documents on a regular basis (e.g., at some time interval). As can be realized, such an approach may lead to an unnecessary proliferation of snapshots, as snapshots may be taken at the time interval regardless of whether such a snapshot is needed or desired. This approach therefore wastes computing resources by devoting processor cycles and computing time to the capture of these unnecessary snapshots and by utilizing a great deal of storage resource to store these unneeded snapshots.

Moreover, even in cases where a snapshot is captured, such a snapshot may capture every document contained in the virtual document and may only capture the latest (e.g., most recent) versions of all of these documents This leads to situations where the snapshot may include unnecessary or extraneous documents (e.g., documents that do not pertain to a user's desires or needs), or may contain documents that do not have pertinent information. For example, in some situations only certain documents of a virtual document may be germane to a user's interest, or it may be the case that a previous version of a document included in a virtual document may actually be more germane to a user's desire than the latest version of the document that would be captured by a snapshot.

It would thus be desirable to have content management systems that could allow external events or data associated with these events (e.g., data of the documents associated with the events) to drive the capture of snapshots and allow such snapshots to be tailored to the documents, and versions of those documents, that are related to those events or data.

To address those desires, among others, embodiments as disclosed herein may allow external events or data to drive the generation of content within a content management system. Specifically, embodiments may allow events generated from external sources (or data determined from those events, or otherwise determined) to drive the generation of content (or metadata associated with that content) in the content management system. These event sources may be external users of the content management system that may generate events associated with documents that are being uploaded, or otherwise accessed, at the content management system. Thus, for example, a user interacting with an application that utilizes documents at the content management system may perform an action that may cause the application to generate an event that may be received at the content management system. The event may include, or be associated with a new document, or version of a document.

These events, or documents associated with the event, may be evaluated based on one or more of a set of event rules to generate an event code for the event. The one or more event rules selected for processing the event (e.g., the document) may be selected based on a type of the event, the type of document, or other associated data. Such an event rule may, for example, define a parsing, searching or other processing of the document to identify certain aspects or data of the document of the event. The event rule can also specify zero or more event codes that may be associated with the event based on the outcome of the processing of the event.

When the content management system receives the event, the associated document, and any event code associated with the event, the content management system can store the received document (e.g., as a new version of the document) and store an identifier for the event or the event code as metadata on the new version of the document. If the document is associated with other documents the content management system may apply one or more of a set of snapshot rules to the event to determine if content should be created. The one or more of the set of snapshot rules to apply may be selected based on the type of the event, the event code, the type of (e.g., received) document or other data associated with the event. The snapshot rule may be applied to the event (e.g., the event code, event document, etc.) to determine if content should be generated based on the event. If it is determined content should be created, the content management system can generate the content or perform other actions, including for example, storing the event code in metadata of another document or an event identifier for the event into the metadata of associated documents (or versions of the document).

As discussed, a content management system may utilize virtual documents. In some embodiments, the use of virtual documents by a content management system may be leveraged by the content management system to facilitate the generation of content based on events. In particular, the dynamic generation of a snapshot of a virtual document may be driven by events. Events may, for example, include an identifier of a particular (e.g., instance) of a virtual document (e.g., type) and an associated document, and may include an identifier for the event (an event identifier). When the event is received, the document associated with the event may be stored as a new version of that document in association with the virtual document. Additionally, each document may have a field in its metadata into which event data such as an event identifier or an event code associated with the event may be stored. This metadata may be hidden fields or the like.

Specifically, in some embodiments the event can be evaluated using a snapshot rule to determine if a snapshot should be taken or if event data should be stored in association in metadata for a document. For example, an event identifier may be stamped in the current version of all or a subset of the current versions of documents of the virtual document. Additionally, event codes determined for the event may be stored in the metadata of one or more versions of all, or a subset of, the documents of the virtual document. A snapshot rule may include search parameters or other evaluation data that allows the documents (e.g., the current or previous versions of the documents of an instance of a virtual document) to be evaluated based on event data (e.g., such as the type of event or an event code associated with the event) to determine which documents should have the event data (e.g., an event identifier or an event code) stored in that document's event metadata for the document. This may, for example, include versions of documents of the instance of the virtual document that are not the current version of that document. In some embodiments, if a document is not relevant or responsive to the snapshot rule, an event identifier for the event may be stored in association with the current version of that document.

In particular, a snapshot rule may specify that a snapshot may be taken of a virtual document and specify the documents of that virtual document that should be captured in such a snapshot. The specification of the type of documents in the snapshot rule may include criteria for documents to be captured in the snapshot. This criteria may include, for example, document types or an event code such that documents of the virtual document that have that event code may be captured in the snapshot, even in cases where that document is not the latest version of that document. Based on the document specification of the snapshot rule a snapshot may then be created for that virtual document, wherein that snapshot may include the documents specified by the snapshot rule. in such cases, in some embodiments if multiple versions of a document of the virtual document are associated with the document specification criteria, the latest version of the document meeting the specified criteria may be captured in the snapshot.

As can be seen then, embodiments as disclosed may provide numerous technical advantages. Specifically, embodiments may allow the creation of snapshots for virtual document only when such snapshots are needed or desired (e.g., based on certain criteria) based on events or data associated with that virtual document. This dynamic, tailored approach to capturing snapshots may alleviate the need for a user to manually capture such snapshots, or even for the user to be informed of events surrounding a virtual document. Moreover, as snapshots are not being captured needlessly at some time interval, computing resources such as processor cycles or storage utilization may be conserved and more efficiently utilized, as snapshots are only captured at the point where they are needed and desired. Additionally, as embodiments may only capture the documents or versions of the documents desired in a given snapshot, not only are computing resources conserved, but snapshots that are more germane to a user's interest or application may be captured.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 2A-1-2D are a block diagrams of embodiments of a content management system for event driven generation of content.

FIGS. 5A-5I are depictions of example virtual documents and their associated metadata.

DETAILED DESCRIPTION

Figure 1:
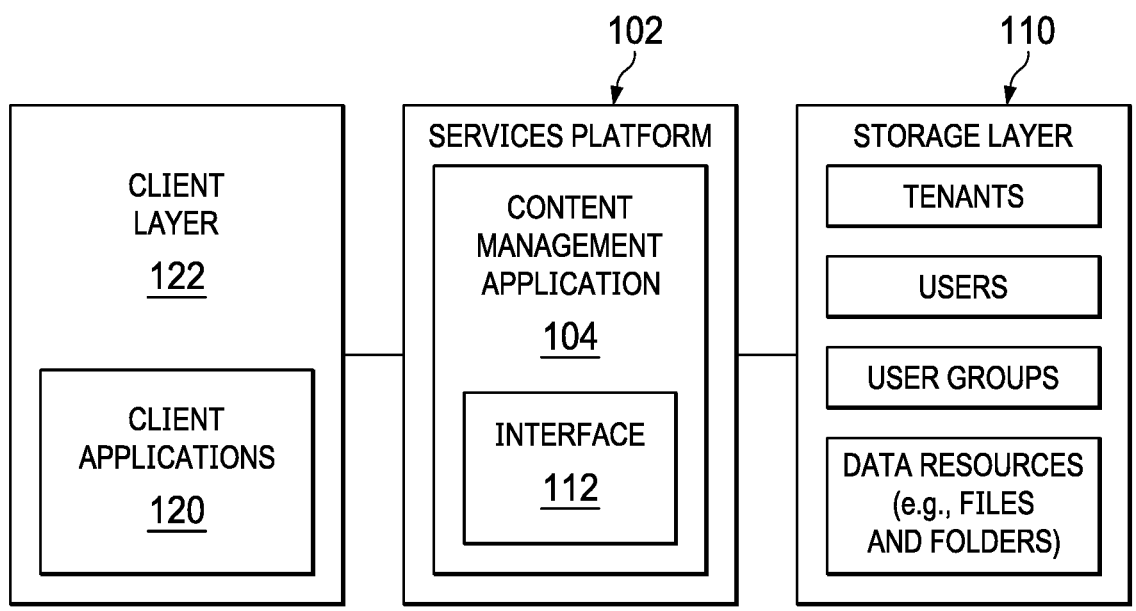
FIG. 1 is a block diagram of an example environment including one embodiment of a multitenant content management system.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before delving into more detail regarding embodiments, some brief discussion may be useful. As discussed, often times large enterprises or other entities employ content management systems (CMS) such as OpenText's Documentum™ to manage their content, allowing for the management of such content by controlling the access, editing, updating, versioning, etc. of content. It is desired, however that content management systems react to changes in external environments. Currently reactive mechanisms are available only to trigger workflows based on external events. As an example, when a new document is created in a CMS a process may be triggered that will automatically move the document into a specific folder. As an example, in current CMS when a change in a document occurs, a user may log into the system and manually upload a new version of the document. However, there is typically no way to see the history of related changes (e.g., with other associated documents) or use events associated with that document to drive the generation of content within the content management system. What is desired is have a reactive mechanism that manages, manipulates, or otherwise generates content (collectively hereinafter manage) content in a CMS.

This is especially problematic with respect to what are referred to as "virtual documents." A virtual document is a document which holds other documents. Thus a virtual document may be a document which acts as a container. A virtual document can contain other virtual documents. The document which acts as a container is called the parent document while the documents which are contained in the parent document are called as child documents. Each of the documents of a parent document may itself be a virtual document so the nesting of such virtual documents may comprise multiple levels.

Accordingly, a virtual document is a document comprised of a set of related documents in the content management system, where each of those related documents may itself have multiple versions and may be independently modified. As such, the virtual document may itself have different version comprised of different child documents (e.g., versions or types of child documents, etc.). In some cases, there may be a schema for each type of virtual document and defines each type of document that may be comprised by the virtual document. The use of such virtual documents allows users to work on individual documents of a virtual document independently while managing the versions of those documents.

In some cases, a snapshot of these virtual document may be desired by a user, where the snapshot allows a user to take or make an archive of a virtual document that captures that state of the virtual document at a moment in time. Usually, this is a manual process entailing that the user initiate the generation of a snapshot. These snapshots may thus be problematic. A user may not know when to take such a snapshot of a virtual documents as important events occurring with respect to that virtual document may be opaque to a user. For example, suppose a virtual document for a medical record for a patient includes multiple documents (e.g., a blood test report and an x-ray). Doctors at two different locations may update these documents. Thus, when one of the documents of the virtual document is updated (e.g., the x-ray), it may be desired to capture a snapshot of the medical record by the doctor associated with the blood test report. This doctor, may, however, be unaware that the x-ray was updated and thus may not know to capture a desired snapshot.

To deal with this, in many cases, snapshots may be taken of virtual documents on a regular basis (e.g., at some time interval). As can be realized, such an approach may lead to an unnecessary proliferation of snapshots, as snapshots may be taken at the time interval regardless of whether such a snapshot is needed or desired. This approach therefore wastes computing resources by devoting processor cycles and computing time to the capture of these unnecessary snapshots and by utilizing a great deal of storage resource to store these unneeded snapshots.

Moreover, even in cases where a snapshot is captured, such a snapshot may capture every document contained in the virtual document and may only capture the latest (e.g., most recent) versions of all of these documents This leads to situations where the snapshot may include unnecessary or extraneous documents (e.g., documents that do not pertain to a user's desires or needs), or may contain documents that do not have pertinent information. For example, in some situations only certain documents of a virtual document may be germane to a user's interest, or it may be the case that a previous version of a document included in a virtual document may actually be more germane to a user's desire than the latest version of the document that would be captured by a snapshot.

It would thus be desirable to have content management systems that could allow external events or data associated with these events (e.g., data of the documents associated with the events) to drive the capture of snapshots and allow such snapshots to be tailored to the documents, and versions of those documents, that are related to those events or data.

To address those desires, among others, embodiments as disclosed herein may allow external events or data to drive the generation of content within a content management system. Specifically, embodiments may allow events generated from external sources (or data determined from those events, or otherwise determined) to drive the generation of content (or metadata associated with that content) in the content management system. These event sources may be external users of the content management system that may generate events associated with documents that are being uploaded, or otherwise accessed, at the content management system. Thus, for example, a user interacting with an application that utilizes documents at the content management system may perform an action that may cause the application to generate an event that may be received at the content management system. The event may include, or be associated with a new document, or version of a document.

These events, or documents associated with the event, may be evaluated based on one or more of a set of event rules to generate an event code for the event. The one or more event rules selected for processing the event (e.g., the document) may be selected based on a type of the event, the type of document, or other associated data. Such an event rule may, for example, define a parsing, searching or other processing of the document to identify certain aspects or data of the document of the event. The event rule can also specify zero or more event codes that may be associated with the event based on the outcome of the processing of the event.

When the content management system receives the event, the associated document, and any event code associated with the event, the content management system can store the received document (e.g., as a new version of the document) and store an identifier for the event or the event code as metadata on the new version of the document. If the document is associated with other documents the content management system may apply one or more of a set of snapshot rules to the event to determine if content should be created. The one or more of the set of snapshot rules to apply may be selected based on the type of the event, the event code, the type of (e.g., received) document or other data associated with the event. The snapshot rule may be applied to the event (e.g., the event code, event document, etc.) to determine if content should be generated based on the event. If it is determined content should be created, the content management system can generate the content or perform other actions, including for example, storing the event code in metadata of another document or an event identifier for the event into the metadata of associated documents (or versions of the document).

As discussed, a content management system may utilize virtual documents. In some embodiments, the use of virtual documents by a content management system may be leveraged by the content management system to facilitate the generation of content based on events. In particular, the dynamic generation of a snapshot of a virtual document may be driven by events. Events may, for example, include an identifier of a particular (e.g., instance) of a virtual document (e.g., type) and an associated document, and may include an identifier for the event (an event identifier). When the event is received, the document associated with the event may be stored as a new version of that document in association with the virtual document. Additionally, each document may have a field in its metadata into which event data such as an event identifier or an event code associated with the event may be stored. This metadata may be hidden fields or the like.

Specifically, in some embodiments the event can be evaluated using a snapshot rule to determine if a snapshot should be taken or if event data should be stored in association in metadata for a document. For example, an event identifier may be stamped in the current version of all or a subset of the current versions of documents of the virtual document. Additionally, event codes determined for the event may be stored in the metadata of one or more versions of all, or a subset of, the documents of the virtual document. A snapshot rule may include search parameters or other evaluation data that allows the documents (e.g., the current or previous versions of the documents of an instance of a virtual document) to be evaluated based on event data (e.g., such as the type of event or an event code associated with the event) to determine which documents should have the event data (e.g., an event identifier or an event code) stored in that document's event metadata for the document. This may, for example, include versions of documents of the instance of the virtual document that are not the current version of that document. In some embodiments, if a document is not relevant or responsive to the snapshot rule, an event identifier for the event may be stored in association with the current version of that document.

In particular, a snapshot rule may specify that a snapshot may be taken of a virtual document and specify the documents of that virtual document that should be captured in such a snapshot. The specification of the type of documents in the snapshot rule may include criteria for documents to be captured in the snapshot. This criteria may include, for example, document types or an event code such that documents of the virtual document that have that event code may be captured in the snapshot, even in cases where that document is not the latest version of that document. Based on the document specification of the snapshot rule a snapshot may then be created for that virtual document, wherein that snapshot may include the documents specified by the snapshot rule. in such cases, in some embodiments if multiple versions of a document of the virtual document are associated with the document specification criteria, the latest version of the document meeting the specified criteria may be captured in the snapshot.

in one specific embodiment, a content management system, can comprise a schema registry including a schema definition of a schema of a type of virtual document, wherein the schema definition includes a virtual document identifier for particular instances of virtual documents and document types defining the schema of the type of virtual document. A data store can store the instances of such virtual documents including child documents of those document types for each instance of the virtual document.

The content management system of embodiments may also include a (event) rules engine and a snapshot engine. The rules engine may be adapted for receiving an event having a virtual document identifier (e.g., for an instance of a virtual document), an event identifier and a new version of a document of one of the documents of the virtual document. The rules engine may identify an event rule based on the event, type of virtual document or the document type of the document received. The rules engine can evaluate the new document to generate an event code based on the event rule, and send the event code and the event to a snapshot engine.

The snapshot engine may be adapted for receiving the event code and the evet and storing the new document as a new version of a document in the virtual document. The snapshot engine may also be adapted for storing the event data for the event in metadata associated with the new version of the document, wherein the event data includes the event identifier. The snapshot engine can determine a snapshot rule associated with the event based on the event code, the document type of the new document or the type of virtual document and evaluate the snapshot rule to determine that a snapshot should be created. A snapshot of the virtual document can then be created, where creating the snapshot comprises locating a version of the second document based on the snapshot rule and storing the event data for the event in metadata associated with that version of the second document.

Embodiments will now be discussed in more detail with respect to FIG. 1. Here, a diagrammatic representation of one embodiment of an architecture for a multitenant content management service. In one embodiment, the multitenant content management service is deployed on a cloud platform. Here, a services platform 102 provides a content management application 104 that may be accessed through an interface 112, which may be a Representational State Transfer (REST) or other interface. Services platform 102 may be implemented on a server or servers, including, but not limited to, on servers of a cloud computing platform. According to one embodiment, services platform 102 is a web services platform and content management application 104 is a web application.

Various client applications 120 (usually remote) in a client layer 122 may request services offered by content management application 104 using the interface 112 offered by the content management application 104 or generate events to interface 112 offered by the content management application 104. In some cases, these client applications 120 may be proprietary client applications executing on a user client's computing device associated with, or provided by, the provider of the content management application 104 or may be browser-based interfaces provided by the provider of the content management application 104. For example, a user at a client device may access a certain location (e.g., Universal Resource Locator (URL)) associated with the content management application 104 using a browser and a browser-based application for accessing the content management application 104 may be provided.

As the user interacts with a client application 120, requests for various services provided by the services platform 102 may be sent by the client application 120, received through the interface 112, and the content management application 104 may take appropriate actions. Client devices may access content from content management application 104 over a network, which may be a LAN, WAN, such as the Internet, or other network. Client devices may include a variety of device types including, but not limited to, personal computers, workstations, smart phones, laptop computers, or other computer devices operable to access data from services platform 102. It should be understood that a system may include any number of servers and clients.

In many cases, the content management application 104 requires data storage and management to implement the functionality of the platform. Accordingly, services platform 102 may include, or access a storage layer 110 used for such data storage and data management. This storage layer may include one or more databases, one or more filesystems, a combination thereof or other storage.

According to one embodiment, content management application 104 supports multitenancy. Each tenant is a defined entity in content management application 104 and has a unique tenant ID. A tenant defines a grouping of users. For example, tenants may correspond to organizations that are customers of a content management service provider where each tenant holds user accounts for employees or agents of the corresponding organization. Moreover, in some embodiments, individuals may subscribe for personal accounts. For example, a content management service may offer a free tier of accounts available to the general public. In one embodiment, users associated with personal accounts are not affiliated with a tenant. In another embodiment, users associated with personal accounts are associated with a system tenant. For example, according to one embodiment, the content management application 104 maintains a special tenant of its own tier, referred to herein as the "Public tenant." Content management application 104 can isolate users under the Public tenant from each other. Effectively, the Public tenant holds all free user accounts. In another embodiment, free user accounts are established under a set of Public tenants (e.g., a Public tenant is defined for each free account or Public tenants are established for groups of free user accounts). According to one embodiment, users of free accounts that exist within a Public tenant do not have access to management of the Public tenant.

Each tenant can have associated users, user groups, and data resources, which may be managed as objects. Data storage layer 110 may thus provide an object-based data store to store managed objects. As will be appreciated, users, user groups and data resources are segregated by tenant. Users can be assigned roles and privileges with respect to user groups and data resources and user groups can be assigned roles and privileges with respect to data resources. According to one embodiment, roles and associated privileges assigned to roles are defined at a system level. In addition, or in the alternative, roles and associated privileges may be defined on a per-tenant basis.

The data resources of a tenant include files and folders managed as objects. Managed folders may be "virtual" folders that do not correspond to actual file directory paths in a file system of storage layer 110. The files managed by content management application 104 are stored in a file system of data storage layer 110, a database (e.g., as blobs), or as sets of logically related data managed as file objects.

In one embodiment, each file and folder managed by content management application 104 is associated with content management metadata. The content management metadata may include an object identifier associated with each item managed by the content management application 104. In particular, in order to manage content in the content management system (e.g., as stored in storage layer 110) the content management application 104 may utilize one or more object identifiers, such as GUI Ds to identify objects. Accordingly, content management metadata may include metadata associated with a managed object. Content management metadata may contain enough information that the content management application 104 will be able to, for example, locate the managed object in storage layer 110 even in cases where the managed object has changed location on the file system or determine if an object is a latest or same version of that object, or perform other operations with respect to managed objects.

Content management application 104 provides a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. The content navigation structure may or may not reflect an actual arrangement of files and folders in a file system of storage layer 110.

Content management application 104 provides user interface functionality for accessing items managed by content management application 104. The interface functionality may be provided through any suitable mechanism including, but not limited to, a web application server exposing a REST API or through another mechanism. Content management application 104 processes requests (e.g., commands) submitted via the interface by client applications running on client devices to enable users to perform various operations via a client application, such as uploading items, downloading items, reserving items, editing content, searching, adding items to containers, removing items from containers, adding containers, editing containers, removing containers and other operations. A user's ability to access particular items and perform particular operations is limited based, for example, on permissions.

Content management application 104 provides the capability for a member of a tenant (i.e., a user who belongs to the tenant) to define users groups that include external users to allow the external users to access specified content of the tenant. Content management application 104 further provides the capability for a member of a tenant to designate an external user as a group administrator for the user group. As such, and external user can be delegated administrative privileges to add and remove users, including other external users, to/from the external user group to change which users have access to the specified content.

Figures 1, 2A:
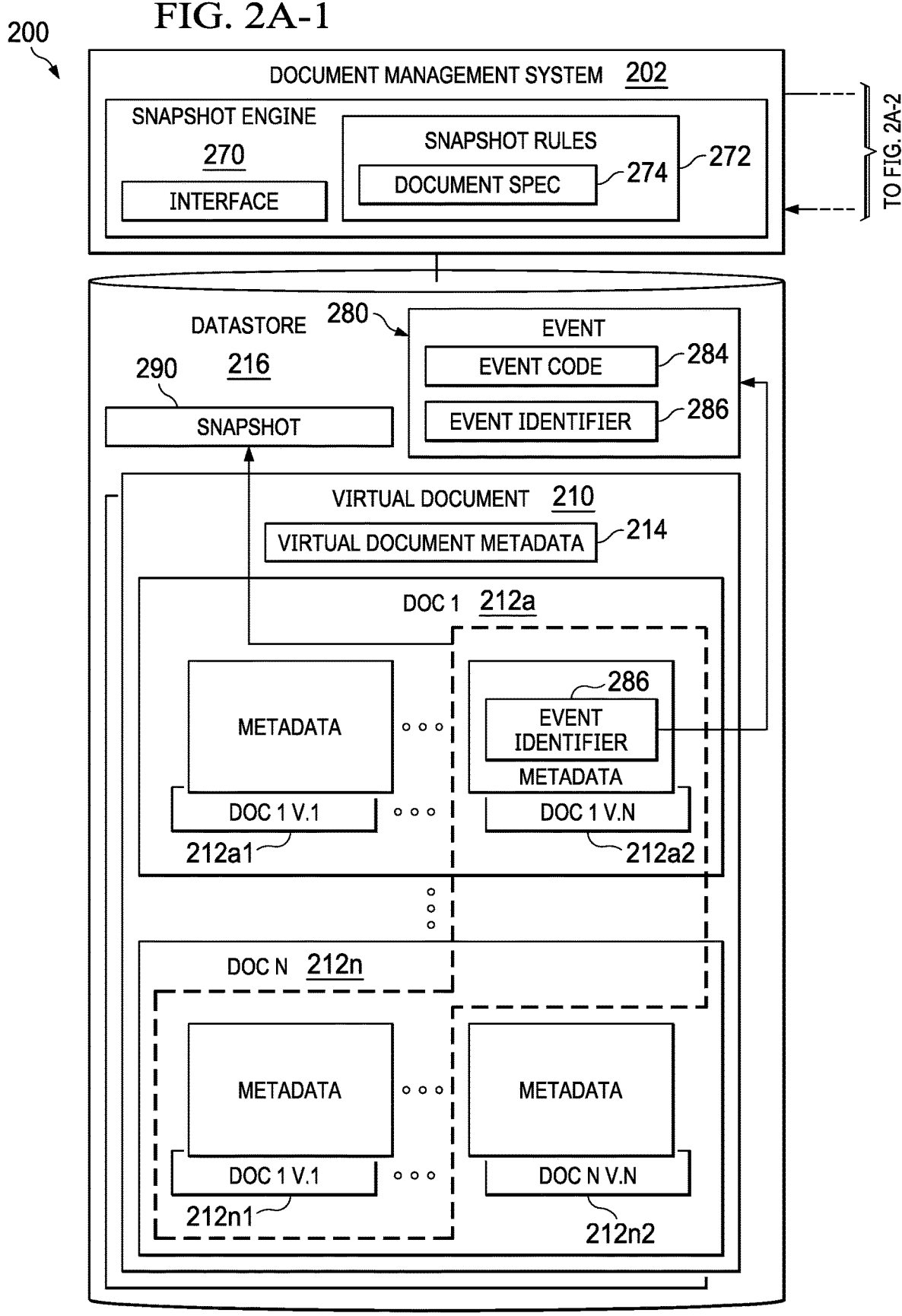
Figures 2, 2A:
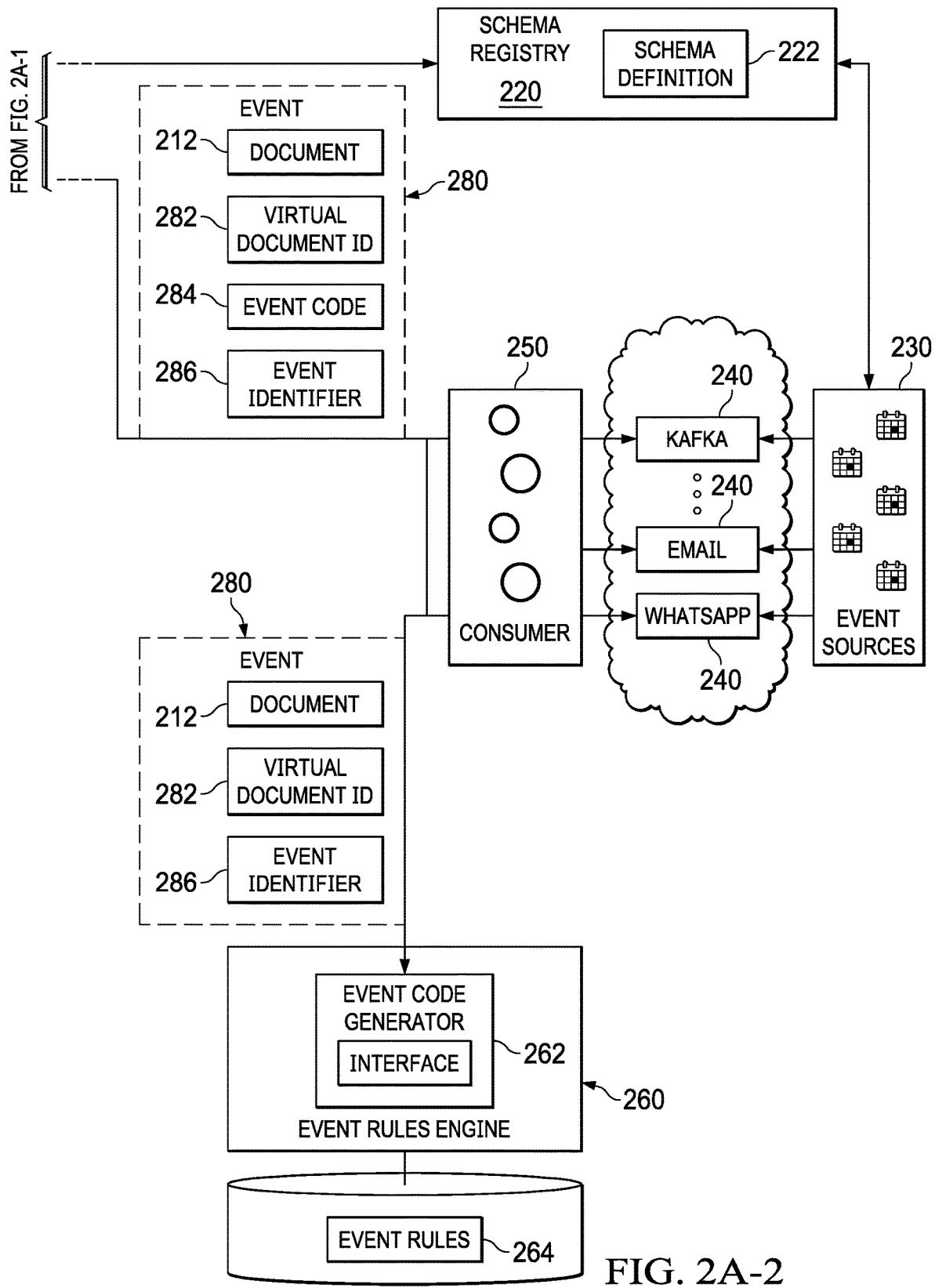

Moving to FIGS. 2A-1 and 2A-2 now, one embodiment of a content management system 200 that allows event driven generation of content is depicted. The content management system 200 may include a document management system 202 that utilizes virtual documents. Users may access the content management system 200 over a network (e.g., the Internet, an internet or intranet, a wired or wireless network, including a cellular network, etc.) through applications associated with content management system 200 such as browser based applications, desktop application, thin of thick client application, third party applications or another type of application.

Content management system 200 may utilize a schema for each type of virtual document 210 utilized by the content management system 200, the schema defines each type of document 212 that may be comprised by the virtual document. In some cases, there may be multiple schema definitions for the same virtual document type or structure. These multiple schema definitions may be utilized to provide to different systems based on a wide variety of criteria, including security, tenancy, system capabilities, type of data or document, or other considerations. Utilizing a schema registry may allow data exchanged between two systems to have a format that the systems exchanging data may agree upon or otherwise utilized. In this manner data can be utilized consistently (e.g., parsed processed, etc.) between systems.

Accordingly, in one embodiment, content management system 200 includes schema registry 220 including schema definitions 222 of a schema of each type (or a subset of types) of virtual document defined in the content management system 200. Each schema definition includes a virtual document identifier for each instance 210 of that type of virtual document stored at content management system. Moreover, the schema definition for a type of virtual document includes a definition of each type of document that will be included in that type of virtual document. These schema definitions 222 may be particular not only to virtual documents but may also by particular to tenants or even users of the content management system 200.

Thus, when a user (e.g., associated with a tenant) accesses the content management system 200 (e.g., with particular credentials) that user (or the application the user is utilizing to access content management system 200) may be provided with a schema definition appropriate to that tenant or user. As the schema definition comprises actual identifiers for the documents, by providing the user with a schema definition comprising identifiers that only that user (or tenant) is authorized to access, the schema registry 220 may provide some measure of security as access may restricted to only those documents identified in the schema provided (e.g., as the user or the user's application may not have identifiers or otherwise be aware of any other documents). As such, when a user authenticates with the content management system 200 using an application, the application may access the schema definition associated with the user or tenant and present the user with a set of documents that the user may access through that application based on the identifiers of those documents present in the schema registry. The user can then interact with the application to create or update those documents.

The content management system 200 also includes a data store 216 storing documents 210, 212 that are managed by the content management system 200, where each of the those documents 210, 212 may have multiple versions (where each version may be a document where the different versions comprise documents associated with another through, for example, metadata identifying them as a versions of one another). Each document 210, 212 may thus have an associated identifier (e.g., a Globally Unique Identifier or the like). Such an identifier may be referred to as a Chronicle Identifier (ID). Versions of the same document may be associated with the first version of that document using an identifier associated with the first version of the document. For example, documents may be associated with objects such that each document is stored as an object in the datastore. In such embodiments, the Chronicle ID for versions of a document may be the object identifier of the object storing the first version of that document. Accordingly, by utilizing such a Chronicle ID, any document 210, 212 and any version of that document desired may be determined or obtained. This may be referred to as a version tree with the root object of the version tree being the object associated with the parent document (e.g., the first version of a document and having the object identifier that it used as the Chronicle ID for the version tree (e.g., all documents within the version tree are associated with that object ID for the parent object of the version tree).

The data store 216 may thus store the instances of virtual documents 210 of types defined in the schema registry 220. For example, an (instance of a type of) virtual document 210 as stored by the content management system 200 may include metadata 214 for the virtual document 210 (e.g., including, for example, a Chronicle ID of the first version of that virtual document 210). The virtual document 210 may also include a set of related documents 212a, 212n, etc. (e.g., of the type defined in the schema definition for that type of virtual document) in the content management system 200, where each of those related documents 212 may itself have multiple versions 212a1, 212a2, 212n1, 212n2, etc. Each of the documents 212 may itself be a virtual document 210 so the nesting of such virtual documents 210 may comprise multiple levels. Each document 212 (e.g., each version of the document 212a1, 212a2, 212n1, 212n2, etc.) may have associated metadata 214 (e.g., that may be specific to that document version 212a1, 212a2, 212n1, 212n2, etc. The use of such virtual documents 210 allows users to work on individual documents 212 of a virtual document independently while managing the versions 212a1, 212a2, 212n1, 212n2, etc. of those documents 212.

Thus, when virtual documents 210 (e.g., instances of a type of virtual document defined in a schema definition 222) are created in the content management system 200, the schema definition may be updated with an identifier for the virtual document 210. The identifier may, for example, be the same as the identifier stored in the virtual document metadata 214 or otherwise associated with the virtual document 210 by content management system 200. For example, the identifier for the virtual document 210 may be the Chronicle ID of the virtual document.

It may be helpful here to look at an example of a schema definition:

```
{
  "Root": {
    "type": "VirtualDocument",
    "name": "Root",
    "property": "root",
    "values": [
      "0x1",
      "0x2",
      "0x3"
    ],
    "children": [
      {
        "type": "Document",
        "property" : "report",
        "values": [
          "BloodTestReport",
          "XRayReport",
          "UrineTestReport",
          "FitnessReport"
        ]
      }
    ]
  }
}
```

Thus, notice here that this example schema definition is for a virtual document type for a medical record that currently has three instances of a virtual document of that type stored in the data store at a content management system (where those instances are identified by the identifiers, e.g., Chronicle IDs, 0x1, 0x2 and 0x3). This type of virtual document may include child documents of the type "BloodTestReport", "XRayReport" "UrineTestReport" and "FitnessReport", where each of those documents may themselves have multiple versions.

As discussed above, embodiments as disclosed herein may allow external events to drive the generation of content within a content management system. In particular, embodiments may allow events generated from external (or internal) event sources 230 to drive the generation of content (or metadata associated with that content) in the content management system 200. These event sources 230 may include various client or third-party applications associated with content management system 200 or other applications which interact with the content management system 200 that the user may utilize. These event source 230 may be associated with tenants of the content management system 200 or other users of content management system 200 and communicate through various channels 240 that may be monitored (e.g., through push or pull interfaces or otherwise) by a consumer 250.

In particular, these event sources 230 may access documents 212 or virtual documents 210 of the content management system 200 through interfaces provided by the content management system 200 (e.g., to create, update, interact with or other access or interact with the documents 212 or virtual documents 210 or functionality of the content management system 200). Additionally, event sources 230 may access the schema registry 220 through an interface provided by the content management system 200 (e.g., by the schema registry 220) to access the schema definition 222 for a type of virtual document. For example, the event source 230 may interact with the schema definition for a virtual document 210 associated with a document 212 with which the event source 230 is interacting (e.g., updating, editing, creating a new version, etc.). The event source 230 can then generate an event based on the schema definition. The event can be published, sent, or otherwise communicated through a communication channel 240 to the content management system 200. These channels 240 may include internal or external messaging queues or topics (e.g., as provided by Apache's Kafka), email to an account associated with the content management system 200, a messaging application such as WhatsApp, an Application Programming Interface or RESTful interface offered by the content management system 200, etc. Each of these communication channels may be monitored or otherwise access by a consumer 250 of the content management system 250 to obtain such events.

Events 280 may, for example, include an event identifier, and an identifier of a particular (e.g., instance) of a virtual document (e.g., type) and a document (e.g., a file or bitstring including the data of the document, or a location of the document). Such an identifier of the virtual document 210 may be, for example, obtained from the schema definition 222 for the virtual document type. The event may thus define a path that includes a root with an identifier of a virtual document, and including the path or definition of any child documents for that virtual document included in the event.

For example, suppose a user at a medical provider "XYZ Client" utilizes a medical application at the user's site which access the content management system. When the user authenticates with the medical application the medical application may access the example schema definition for the medical record given above. A user of this application may access the virtual document (e.g., medical record) identified by the identifier 0x1 where that virtual document may be associated with a particular patient (e.g., "Alice"). This user may then interact with application to upload a blood test report in association with that patient's medical record. Here, the application may generate an event to upload that blood test report to the content management system 200 in association with the virtual document having the identifier "0x1".

```
{
    from : XYZ Clinic
    date: 22-3-2020
    path: { root : 0x1, report: BloodTestReport}
    event id : 0x1234
    file : <file data>
}
```

Here, the event includes an identifier of an event source (e.g., "XYZ Clinic"), an identifier for the event (0x1234) and the path (virtual document 0x1 and BloodTestReport) for the included file. Thus, the event indicates that a BloodTestReport document for the virtual document identified by the identifier 0x1 (e.g., the Chronicle ID for the virtual document) is included in the event identified by the event identifier 0x1234. Moreover, the path for that blood test report (e.g., a XPath or the like), may be included in the event. Such a path may be constructed based on the identifier for the virtual document and the schema definition defining the path of the documents comprising that type of virtual document.

Consumer 250 of the content management system 200 thus obtains events 280 from events sources 230 through the one or more communication channels 240 (e.g., over a computer based network). The event 280 may include an identifier 282 of the virtual document to which it pertains and an associated document 212. It may also include a timestamp and an identifier for that event. When an event 280 is obtained from an event source 230 it may be provided to an event rules engine 260. Event rules engine 260 may include an event code generator 262 that evaluates the received event to determine any codes or other event data to associate with the event 280. Specifically, an event 280 may be evaluated based on one or more of a set of event rules 264 to generate an event code 284 or event data for the event. The one or more event rules 264 selected for processing the event (e.g., the document of the event) may be selected based on a type of the event 280, the type of document 212 included in the event 280, or other associated data. Such an event rule 264 may, for example, define a parsing, searching or other processing of the document to identify certain aspects or data of the document of the event. The event rule 264 can then specify zero or more event codes that may be associated with the event based on the outcome of the processing of the event.

These event rules 264 may be specified (e.g., before the event 280 is received) using an interface associated with the event rules engine 260 or content management system 200. Thus, a user (e.g., an administrator or the like), may access the interface and define one or more event rules 264, using, for example a graphical user interface or the like. These event rules 264 may include a trigger (e.g., a definition for when an event rule 264 should be selected) and an action (e.g., a definition of the processing to be done to a document, what data) and a result (e.g., a definition of a corresponding result of the action and associated codes that should be associated with. For example, an event rule 264 may specify that if the received event includes a blood test report containing a defined value above a certain threshold an particular event code should be associated with the event.

Thus, the event rules engine 260 may be adapted for receiving an event 280 having a virtual document identifier 282, and a document 212 of a particular document type (and which may also include a timestamp or event identifier), and identifying an event rule 264 based on the type of virtual document (e.g., medical report) or the document type (e.g., blood test report) associated with the event 280. Based on the outcome of the evaluation of the document 212 of the event 280 by the rules engine 260 using the one or more selected event rules 264 one or more event codes 284 or other data associated with the event 280 can be generated. For example, an event rule 264 may specify certain search or parsing parameters and associated event codes 284 such that the document 212 may be searched according to the search or parsing parameters and the event codes 284 (e.g., medical codes for a BloodTestReport) may be associated with the event 280.

The event 280 along with any event codes 284 or metadata generated by the event rules engine 260 may then be passed to the document management system 202. When the event 280 and the associated event code 284 or other event data is received by the document management system 202 the document 212 associated with the event may be stored as another (or first) version of that document 212 in the virtual document 210 identified by the virtual document identifier 282 in the received event 280.

Specifically, the document management system 202 may identify the virtual document 210 and the document 212 associated with the received event 280 based on the path included in the received event 280, including the virtual document identifier 282 included in the event 280 and may store the document 212 of the event 280 as a new version 212*a*1, 212*a*2, 212*n*1, 212*n*2, etc. of the associated document 212 in the virtual document 210. The event data (e.g., the event identifier, path, event code 284 or the other data) may also be stored in metadata associated with that version of the document 212 as stored at the document management system).

In one embodiment, the event 280 may be stored in the data store 216 along with the event identifier 286 for that event 280 along with any event code 284 for that event 280 and any other desired event data. The event identifier 286 for that event 280 can then be stored in the metadata of the received and stored document 212 of the event (e.g., which is stored as a new version of a document 212 of the virtual document 210), and can be stored in the virtual document metadata 214 for the virtual document 210. In this manner, both the new document 212 received with the event 280 and the virtual document 210 including that new document 212 may be associated with the event 280 and the associated event code 284 (e.g., through the event identifier).

Suppose for example, document 212 of the event 280 is a new version of document 212a of virtual document 210. Here, the document 212 of the event 280 may be stored as a new version 212a2 of document 212a. Moreover, the event identifier 286 for the event 280 may be stored in the metadata associated with document 212a2 and metadata 214 of the virtual document 210 such that document 212a2 is associated with event 280 (e.g., including event code 284 and any other event data).

The event 280 and associated event code 284, event identifier 286 or other event data may also be provided to the snapshot engine 270. The snapshot engine 270 may be adapted for determining or selecting one or more snapshot rules 272 associated with the event based on the event code 284, the document type of the document 212 included in the event, the type of virtual document 210, an event code 284 associated with the event 280 or another criteria. The snapshot engine 270 may also be adapted for determining a snapshot 290 based on a specified event identifier 286.

A snapshot rule 272 may include search parameters or other evaluation data that allows the documents 212 (e.g., the versions of the documents of an instance of a virtual document) to be evaluated based on event data such the type of event or an event code associated with the event to determine which documents should have the event data (e.g., an event identifier or an event code) stored in that document's event metadata for the document. This may, for example, include versions of documents of the instance of the virtual document 210 that are not the current version of that document 212. In some embodiments, if a document is not relevant or responsive to the snapshot rule, an event identifier 286 or event code 284 for the event 280 may be stored in association with the current version of that document.

These snapshot rules 272 may be specified (e.g., before the event 280 is received) using an interface associated with the snapshot engine 270 or content management system 200. Thus, a user (e.g., an administrator or the like), may access the interface and define one more snapshot rules 270, using, for example a graphical user interface or the like. These snapshot rules 270, may include a trigger (e.g., a definition for when a snapshot rules 270, should be selected) and an action (e.g., an instruction to take a snapshot). The action may also include a document specification 274 including criteria defining what documents are (or are not) to be included in a snapshot of the virtual document 210. For example, a snapshot rule 272 may specify that all documents associated with a virtual document 210 associated with a particular event code 284 or event identifier 286 are to be captured in a snapshot of the virtual document.

The snapshot rule 272 may be applied to the event 280 (e.g., the event code 284) to determine if content should be generated based on the event 280 or associated data. If it is determined content should be created, the content management system 200 can generate the content, including for example, creating a snapshot 290 of the virtual document 210 where the snapshot includes one or more documents 212 of the virtual document 210. The documents 212 included in the snapshot may be determined based on the criteria specified in the snapshot rule 272 and may include all, or a subset of the documents 212 of the virtual document 212, where those documents may be the current, or previous versions, of those documents, depending on the criteria specified in the snapshot rule. The evaluation of the snapshot rule 272 may also result in the storing an event code 284 in metadata of another document 212 or an event identifier for the event 280 into the metadata of another associated document 212.

In some embodiments, then, the snapshot engine 270 may evaluate the snapshot rule 272 using event 280 to determine that a snapshot 290 should be created or if event data should be stored in association with metadata for a document 212. For example, an event identifier 286 may be stamped in the current version of all, or a subset of, the current versions of documents 212 of the virtual document. Additionally, event codes 284 determined for the event 280 may be stored in the metadata of one or more versions of all, or a subset of, the documents 212 of the virtual document.

If the evaluation of the snapshot rule 272 indicates that a snapshot 290 should be created, the snapshot engine 270 may create such a snapshot 290 in association with the virtual document 210. Creating such a snapshot of the virtual document 210 may include locating a version of one or more other (versions of) documents 212 of the virtual document 210 based on the snapshot rule 272 (where those versions may, or may not be, the current (most recent) version of those other document and storing the event data for the event in metadata associated with those versions of that document. The snapshot 290 may include an identifier of the snapshot 290 along with an identifier of the virtual document 210 that is being captured in the snapshot, the Chronicle ID of every document type for every document 212 that is being captured in the snapshot 290 and a document identifier for the version of that document type that is being captured in the snapshot.

For example, when a snapshot 290 is created for a virtual document 210 comprising a medical record for a "Patient X", the following information will be stored in the data store 216 (e.g., where "Chronicle ID" is the Object identifier of the root object of a version tree that contains that object and the "Component ID" is the Object identifier of the specific version of the document to be captured in the snapshot:

| Snapshot Id | | Chronicle Id | Component Id |
|---|---|---|---|
| 1 | Patient x | 090015fa800211f6 | 090015fa800211f612 V1.0 |
| 1 | Blood Test report | 090015fa800211f7 | 090015fa800211f712 V1.1 |
| 1 | Fitness Report | 090015fa800211f8 | 090015fa800211f812 V1.0 |
| 1 | X-Ray | 090015fa800211f9 | 090015fa800211f912 V1.1 |

A snapshot rule 272 may thus include a document specification 274 which may, for example, include search parameters or other evaluation data that allows the document types, or versions thereof (e.g., the versions of the documents 212a1, 212a2, 212n1, 212n2 of an instance of a virtual document 210) to be selected or evaluated based on event data such the type of event 280 or an event code 284 associated with the event to determine which documents should have the event data (e.g., an event identifier or an event code) stored in that document's metadata for the document. Thus, for example, a snapshot rule 272 may include document specification criteria 274 for selecting document types of the virtual document 210 and criteria (e.g., parameters) to use to evaluate those selected documents 212 for inclusion in a snapshot 290. The documents 212 selected may be different than the type of document included in the received event 280 and may include one or more versions of such documents (e.g., that are not the current version of the document 212). This evaluation of the documents 212 of the virtual document 210 may include, for example, versions of documents 212 of the instance of the virtual document that are not the current version of that document. In some embodiments, if a document 212 is not relevant or responsive to the snapshot rule, an event identifier 286 for the event may be stored in association with the current version of that document. Thus, embodiments of such content management systems 200 may allow the tracking of multiple events where each of the those events may be associated with all, or only a subset of, documents of a virtual document.

Accordingly, the application of a snapshot rule 272 may allow the documents (e.g., the versions of the documents of an instance of a virtual document) of the virtual document 210 associated with an event to be evaluated based on event data such as the type of event 280 or an event code 284 or event identifier 286 associated with the event 280 to determine which documents 212 should be captured in the snapshot 290 or which should have the event data (e.g., an event identifier or an event code 284) stored in the metadata for the document. This may, for example, include versions of documents 212 of the instance of the virtual document 210 that are not the current version of that document 212. In some embodiments, if a document is not relevant or responsive to the snapshot rule 272, an event identifier for the event may be stored in association with the current version of that document. Thus, embodiments of such content management systems 200 may allow the tracking of multiple events (or event codes) where each of the those events 280 may be associated with all, or only a subset of, documents 212 of a virtual document 210.

In this manner, when adding a current version of a document to a virtual document, the content management system 200 may enter an event identifier 286 or event code 284 into the metadata of relevant documents 212 of that virtual document 210 as determined, for example, a snapshot rule 272. This will associate the document 212 (e.g., version of the document) to the event. For documents 212 not relevant to the event (e.g., to which no version of the document is relevant to the event), the event identifier 286 may be stamped into the "current version" (e.g., the most recently stored version) of the document. Thus, in addition to storing information about the document like author name, title, date etc., in embodiments the metadata may include a field (e.g., a hidden read only field) that can be used to hold the event identifier 286. Since metadata is searchable, the documents can be searched, sorted, or otherwise organized by an event identifier, including on the fly determination of snapshots or relevant documents associated with an event 280.

Specifically, in some embodiments the event can be evaluated using snapshot rule 272 to determine if a snapshot 290 should be taken or if event data should be stored in association with metadata for a document 212. For example, an event identifier for the event 280 may be stamped in the current version of all or a subset of the current versions of documents of the virtual document. Additionally, event codes determined for the event may be stored in the metadata of one or more versions of all or a subset of the documents of the virtual document 210.

So to continue with the above example, event identifiers (herein E1, E2) which are unique identifiers of an event 280 may be stamped into the event metadata field of relevant versions of the documents:
090015fa800211f612 (v1.0) of Patient X,
090015fa800211f712 (v1.1) of Blood Test
090015fa800211f812 (v1.0) of Fitness report
090015fa800211f912 (v1.1) of Xray

|  | Chronicle Id | V1.0 | V2.0 | V3.0 |
| --- | --- | --- | --- | --- |
| Patient X | 090015fa800211f6 | E1, E2 | | |
| Blood Test report | 090015fa800211f7 | | E1, E2 | |
| Fitness Report | 090015fa800211f8 | | | E1, E2 |
| xRay report | 090015fa800211f9 | E2 | E1 | |

Accordingly, in some embodiments a snapshot of a virtual document may be utilized where the snapshot results in an archive of a virtual document that captures that state of the virtual document at a moment in time. Thus, instead of creating separate snapshots, it is thus, possible to put together snapshots 290 associated with each event 280 based on the event data stored in the metadata fields of documents of a virtual document.

| E1 | Patient X (V1.0) |
| --- | --- |
|  | Blood Test report (V2.0) |
|  | Fitness Report (V3.0) |
|  | X Ray (V2.0) |
| E2 | Patient X (V1.0) |
|  | Blood Test report (V2.0) |
|  | Fitness Report (V3.0) |
|  | X Ray (V1.0) |

Thus, embodiments of such content management systems may allow the tracking of multiple events where each of the those events may be associated with all, or only a subset of, documents of a virtual document. Moreover, embodiments of the content management system 200 may allow the capturing of snapshots 290 based on events, and may allow the capturing of snapshots 290 to occur dynamically in real time as a user interacts with an interface of the content management system 200.

In particular, as discussed, the content management system 200 may store an event identifier 286 for an event 280 into the metadata of all relevant documents 212 as determined, for example, by the application of snapshot rule 272. In this manner, all the relevant documents 212 of a virtual document 210 may be associated with the event 280. For documents 212 not relevant to the event, the event identifier may be associated with the metadata of the "current version" (e.g., the most recently stored version) of the document 212. Thus, in embodiments the metadata for a document 212 may include a field (e.g., a hidden read only field) that can be used to hold the event identifier. This metadata may be the same metadata used to hold document information such as author, title, date of creation, etc. Since metadata for documents 212 is searchable, the content management system 200 may now search, sort, or otherwise organize documents by these event identifiers.

Figures 3, 4:
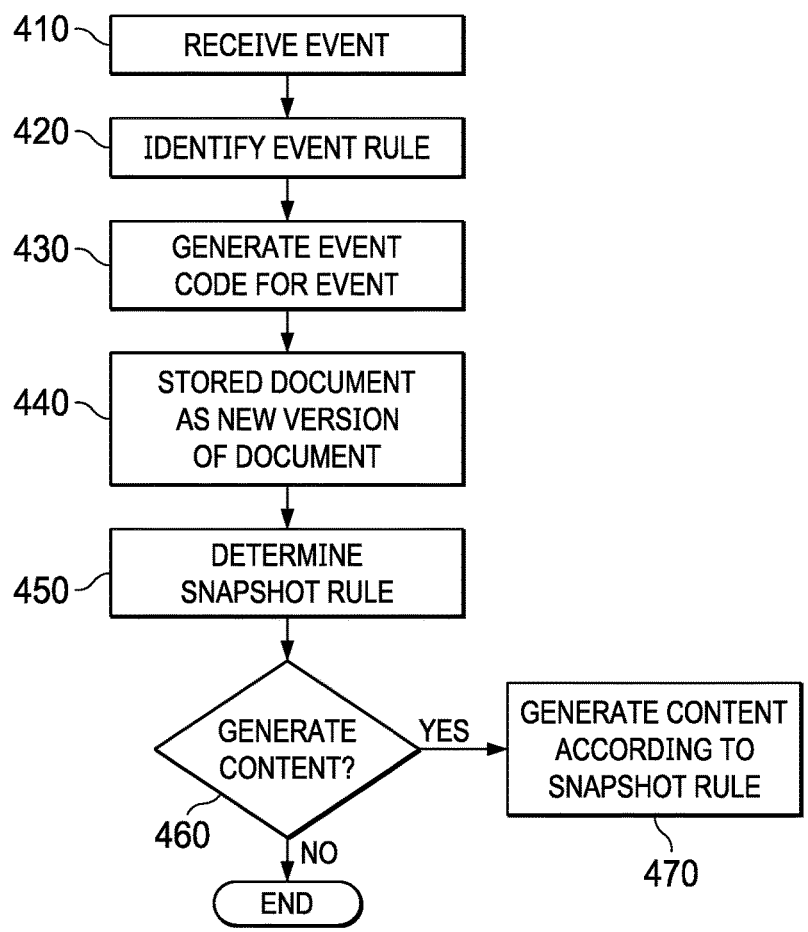
FIG. 3 is a diagrammatic representation of one example of a distributed network environment.
FIG. 4 is a flow diagram for one embodiment of a method of event driven generation of content.

As such the content management system 200 may present an interface that shows, for example, a list of events (and associated documents or event types) and allow the user to obtain information on these events. An example of such an interface is depicted in FIG. 3. Here, for example, clicking on an event will put together a snapshot 290 of the virtual document by querying the parent virtual document 210 for all child documents with metadata for the same event identifier, allowing a snapshot 290 of the virtual document to be put together dynamically in real time from documents 212 of the virtual document 210 relevant to the event of interest (e.g., the event clicked on by the user in the interface) and presented to a user. In such instances, the snapshot engine 270 may be adapted to receive one or more identifiers of events, and create a snapshot 290 of the virtual document 210 that includes versions of documents 212 having that event identifier 286 in their metadata.

Thus, embodiments may offer a number of advantages. Specifically, since metadata of a document can be indexed and searched, it is possible to search documents by event identifiers. Moreover, it is possible to apply facets on the event identifiers and thereby view documents grouped by events (or event identifier). Additionally, while migrating documents into a completely different content management system which may not have the concept of snapshots, it is possible to recreate the event snapshots 290 from the document data. During a migration only documents and metadata may need to migrated to ensure that these snapshots are migrated as well even if done across disparate systems.

Moreover, the storage of event metadata in association with virtual documents 210 (or documents 212 of those virtual documents) may allow the merging of snapshots 290 of a virtual document 210 associated with different events 280. So for example, multiple events 280 associated with a virtual document 210 may be selected (e.g., by a user) and one or more snapshots 290 created from the documents 212 of the virtual document 210 based upon the event metadata associated with the documents 212 of that virtual document 210. In other words, embodiments may allow the combination of snapshots 290 for different events by creating a snapshot out of the relevant documents associated with each event. Specifically, embodiments of a content management system will select the current version of the parent document and the event correlated versions of the documents 212 and put together a snapshot 290 from these documents. In some cases, these snapshots 290 may include versions of the documents 212 that are not the current version of the document 212 or may even include multiple versions of the same document 212.

Figure 2B:
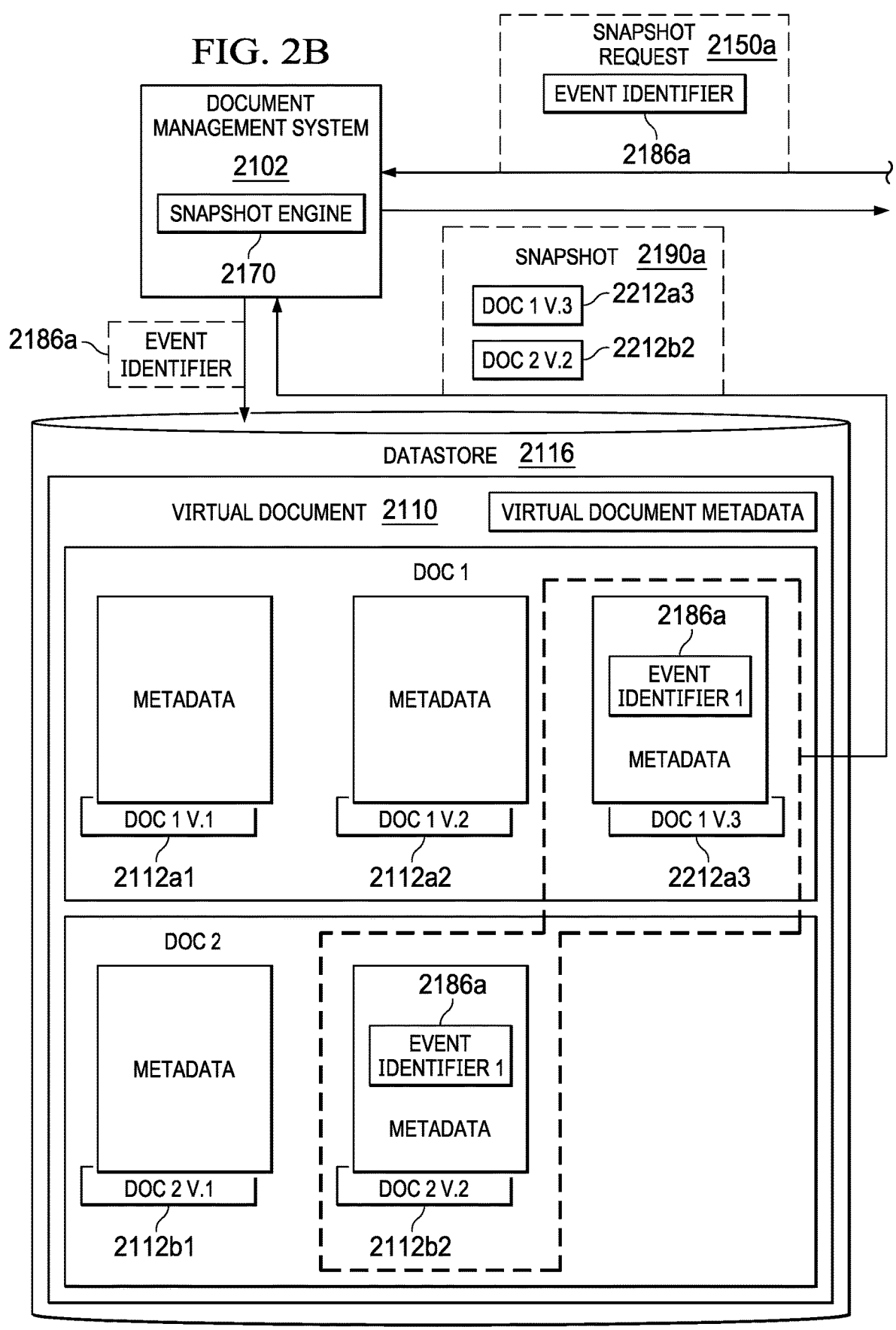
Figure 2C:
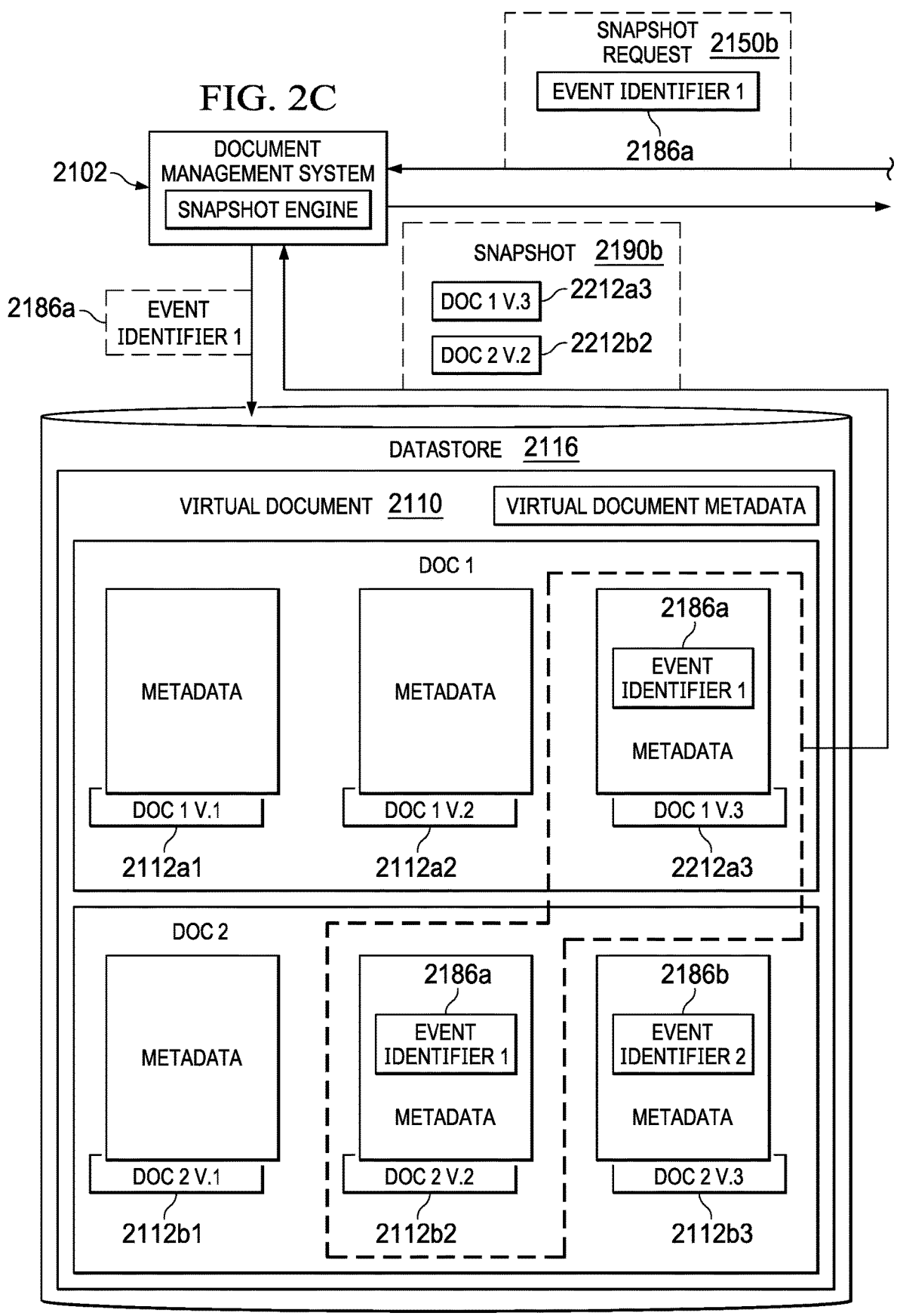
Figure 2D:
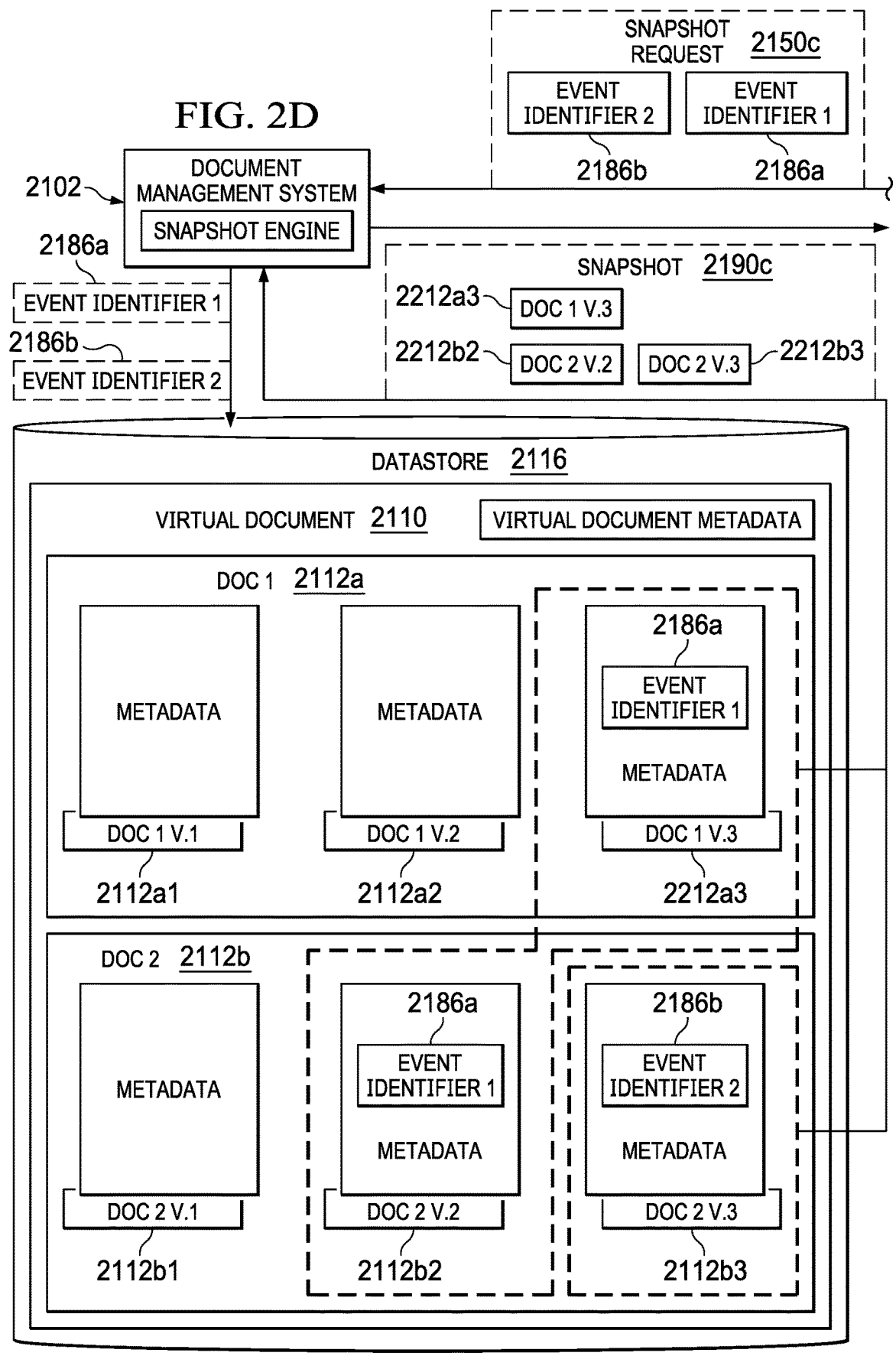

The capture of snapshots based on event metadata may be better understood with reference to FIGS. 2B, 2C and 2D which depict embodiments of capturing snapshots by a content management system. Looking first at FIG. 2B, assume here that a virtual document 2110 has two documents: Doc 1 and Doc 2. There are currently three versions of Doc 1 for virtual document 2110, with document 2112a1 being version 1, document 2112a2 being version 2, and document 2112a3 being version 3 (here, the current version of Doc 1). There are currently two versions of Doc 2 for virtual document 2110, with document 2112b1 being version 1, and document 2112b2 being version 2 (here, the current version of Doc 2). Additionally assume that an event has occurred and the event identifier 2186a for that event has been associated with document 2112a3 (the third version of Doc 1) and document 2112b2 (the second version of Doc 2).

Now suppose, a user utilizing an interface of an application interacting with the content management system (e.g., such as that presented in FIG. 3) indicates that she wants a snapshot of virtual document 2110. Thus, the snapshot engine 2170 of the document management system 2102 may receive a snapshot request 2150a with the event identifier 2186a for the event. When the snapshot engine 2170 receives the snapshot request 2150a that includes the event identifier 2186a, the snapshot engine 2170 can search the virtual document 2110 in data store 2116 using the event identifier 2186a to form snapshot 2190a. Here, the search of the virtual document 2110 based on event identifier 2186a returns document 2112a3 (the third version of Doc 1) and document 2112b2 (the second version of Doc 2) associated with the event identifier 2186a in their respective metadata. These versions of Doc 1 and Doc 2 (documents 2112a3, 2112b2) can then be included in the snapshot 2190a that is returned in response to the snapshot request 2150a and presented to the user through the interface of the application.

Moving on to FIG. 2C, now suppose that that a second event has occurred, where that second event included a third version of Doc 2 for virtual document 2110. That document 2112b3 (the third version of Doc 2) is stored in the data store 2116 in association with Doc 2 of virtual document 2110 and the event identifier 2186b for that event has been associated with document 2112b3 (the third version of Doc 2). Notice here, that event identifier 2186a for the first event is still associated with document 2112a3 (the third version of Doc 1) and document 2112b2 (the second version of Doc 2).

Accordingly, here, when a user utilizing an interface of an application interacting with the content management system (e.g., such as that presented in FIG. 3) indicates that she wants a snapshot of virtual document 2110 associated with the first event, the snapshot engine 2170 of the document management system 2102 may receive a snapshot request 2150b with the event identifier 2186a for the first event. When the snapshot engine 2170 receives the snapshot request 2150b that includes the event identifier 2186a for the first event, the snapshot engine 2170 can search the virtual document 2110 in data store 2116 using the event identifier 2186a to form snapshot 2190b. Notice here that the search of the virtual document 2110 based on event identifier 2186a still returns document 2112a3 (the third version of Doc 1) and document 2112b2 (the second version of Doc 2) associated with the event identifier 2186a in their respective metadata. As such, these versions of Doc 1 and Doc 2 (documents 2112a3, 2112b2) are still included in the snapshot 2190b that is returned in response to the snapshot request 2150b specifying event identifier 2186a and presented to the user through the interface of the application. Notice as well that this (documents 2112a3, 2112b2 being returned in the snapshot 2190b) may be the case even if the event identifier 2 2186b is stored in association with the document 2112a3 (the third version of Doc 1), which may occur, for example, if the event identifier 2186b for the second event is associated with the current version of every document of the virtual document 2110. And these documents (documents 2112a3, 2112b2) may be returned in request for a snapshot despite that there is a more current version of Doc 2 for virtual document 2110.

Turning now to FIG. 2D, as discussed, the storage of event metadata in association with virtual documents, or documents of those virtual documents, may allow the creation of snapshots from documents associated with multiple events. So for example, multiple events associated with a virtual document may be selected (e.g., by a user) and one or more snapshots created from the documents of the virtual document based upon the event metadata associated with the documents of that virtual document. Suppose in this example that a user utilizing an interface of an application interacting with the content management system (e.g., such as that presented in FIG. 3) indicates that she wants a snapshot of virtual document 2110 associated with the first event and the second event. Here, the snapshot engine 2170 of the document management system 2102 may receive a snapshot request 2150c with the event identifier 2186a for the first event and the event identifier 2186b for the second event.

When the snapshot engine 2170 receives the snapshot request 2150c that includes the event identifier 2186a for the first event and the event identifier 2186b for the second event, the snapshot engine 2170 can search the virtual document 2110 in data store 2116 using the event identifier 2186a and the event identifier 2186b to form snapshot 2190c. Here, the search of the virtual document 2110 based on event identifier 2186a for the first event returns document 2112a3 (the third version of Doc 1) and document 2112b2 (the second version of Doc 2) associated with the event identifier 2186a in their respective metadata, while the search of the virtual document 2110 based on event identifier 2186b for the second event returns document 2112b3 (the third version of Doc 2) associated with the event identifier 2186b in its metadata. As such, all of these versions of Doc 1 and Doc 2 (documents 2112a3, 2112b2, 2112b3) are included in the snapshot 2190c that is returned in response to the snapshot request 2150c specifying event identifier 2186a for the first event and event identifier 2186b for the second event. Notice here that two versions of Doc 2 (documents 2112b2 and 2112b3) may be included in the snapshot 2190c and documents from both events may be included in a single snapshot 2190c.

Referring now to FIG. 4, one embodiment of a method for generating content based on events is depicted. Embodiments of such a method may be, for example, implemented in embodiments of content management systems as described herein. As discussed above, embodiments as disclosed herein may allow external events to drive the generation of content within a content management system. In particular, embodiments may allow events generated from external (or internal) event sources to drive the generation of content (or metadata associated with that content) in a content management system. These event sources may, for example, include various client or third-party applications associated with a content management system or other applications which interact with the content management system that the user may utilize.

In particular, these event sources may access documents or virtual documents of a content management system through interfaces provided by the content management system (e.g., to create, update, interact with or otherwise access or interact with the documents or virtual documents or functionality of the content management system. These event source can then generate an event based on these interactions. The event can be published, sent, or otherwise communicated through a communication channel to a content management system.

Thus, the content management system may receive such an event (STEP 410). Events may, for example, include an event identifier, and an identifier of a particular (e.g., instance) of a virtual document (e.g., type) and a document (e.g., a file or bitstring including the data of the document, or a location of the document). An event rule can be identified for the received event (STEP 420), and an event code generated in association with the event (STEP 430).

Specifically, the received event may be evaluated based on one or more of a set of event rules to generate an event code or event data for the event. The one or more event rules selected for processing the event (e.g., the document of the event) may be selected based on a type of the event, the type of document included in the event, or other associated data.

Such an event rule may, for example, define a parsing, searching or other processing of the document to identify certain aspects or data of the document of the event. The event rule can specify zero or more event codes that may be associated with the event based on the outcome of the processing of the event.

Based on the outcome of the evaluation of the event (e.g., document of the event) using the one or more selected event rules, one or more event codes or other data associated with the event can be generated. For example, an event rule may specify certain search or parsing parameters and associated event codes such that the document may be searched according to the search or parsing parameters and the event codes may be associated with the event.

The document can be stored as a new version of that document in association with the virtual document associated with the event (STEP 440). When the event and the associated event code or other event data is received the document associated with the event may be stored as another (or first) version of that document in the virtual document identified by the virtual document identifier in the received event. The event data (e.g., the event identifier, path, event code or the other data) may be stored in metadata associated with that version of the document of the event or one or more other documents of the virtual document.

In one embodiment, the event may be stored along with the event identifier for that event along with any event code for that event and any other desired event data. The event identifier for that event can then be stored in the metadata of the received and stored document of the event (e.g., which is stored as a new version of a document of the virtual document), along with any other document of the virtual document to which it pertains, and can also be stored in the virtual document metadata for the virtual document. In this manner, both the new document received with the event and the virtual document including that new document may be associated with the event and the associated event code (e.g., through the event identifier).

A snapshot rule may also be determined and applied (STEP 450). Specifically, one or more snapshot rules associated with the event may be determined based on the event code, the document type of the document included in the event, the type of virtual document, an event code associated with the event, an event identifier, or another criteria. A snapshot rule may include search parameters or other evaluation data that allows the documents (e.g., the versions of the documents of an instance of a virtual document) to be evaluated based on event data such the type of event or an event code associated with the event to determine which documents should have the event data (e.g., an event identifier or an event code) stored in that document's event metadata for the document. This may, for example, include versions of documents of the instance of the virtual document that are not the current version of that document. In some embodiments, if a document is not relevant or responsive to the snapshot rule, an event identifier or event code for the event may be stored in association with the current version of that document.

The snapshot rule may be applied to the event (e.g., the event code) to determine if content should be generated based on the event or associated data. If it is determined content should be created (Y branch of STEP 460), the content can be generated according to the snapshot rule (STEP 470). This generation of content may include, for example, creating a snapshot of the virtual document where the snapshot includes one or more documents of the virtual document. Where the documents included in the snapshot may be determined based on the criteria specified in the snapshot rule and may include all, or a subset of the documents of the virtual document, where those documents may be the current, or previous versions, of those documents, depending on the criteria specified in the snapshot rule. The evaluation of the snapshot rule may also result in the storing an event code in metadata of another document or an event identifier for the event into the metadata of another associated document.

In some embodiments, then, snapshot rule can be evaluated based on an event to determine that a snapshot should be created or if event data should be stored in association with metadata for a document. For example, an event identifier may be stamped in the current version of all, or a subset of, the current versions of documents of the virtual document. Additionally, event codes determined for the event may be stored in the metadata of one or more versions of all, or a subset of, the documents of the virtual document.

If the evaluation of the snapshot rule indicates that a snapshot should be created, the snapshot may be created in association with the virtual document. Creating such a snapshot of the virtual document may include locating a version of one or more other (versions of) documents of the virtual document based on the snapshot rule (where those versions may, or may not be, the current (most recent) version of those other document and storing the event data for the event in metadata associated with those versions of that document. The snapshot may include an identifier of the snapshot along with an identifier of the virtual document that is being captured in the snapshot, the Chronicle ID of every document type for every document that is being captured in the snapshot and a document identifier for the version of that document type that is being captured in the snapshot.

Accordingly, the application of a snapshot rule may allow the documents (e.g., the versions of the documents of an instance of a virtual document) of the virtual document associated with an event to be evaluated based on event data such as the type of event or an event code or event identifier associated with the event to determine which documents should be captured in the snapshot or which should have the event data (e.g., an event identifier or an event code) stored in the metadata for the document. This may, for example, include versions of documents of the instance of the virtual document that are not the current version of that document. In some embodiments, if a document is not relevant or responsive to the snapshot rule, an event identifier for the event may be stored in association with the current version of that document.

Thus, embodiments may allow the tracking of multiple events (or event codes) where each of the those events may be associated with all, or only a subset of, documents of a virtual document.

Figure 5A:
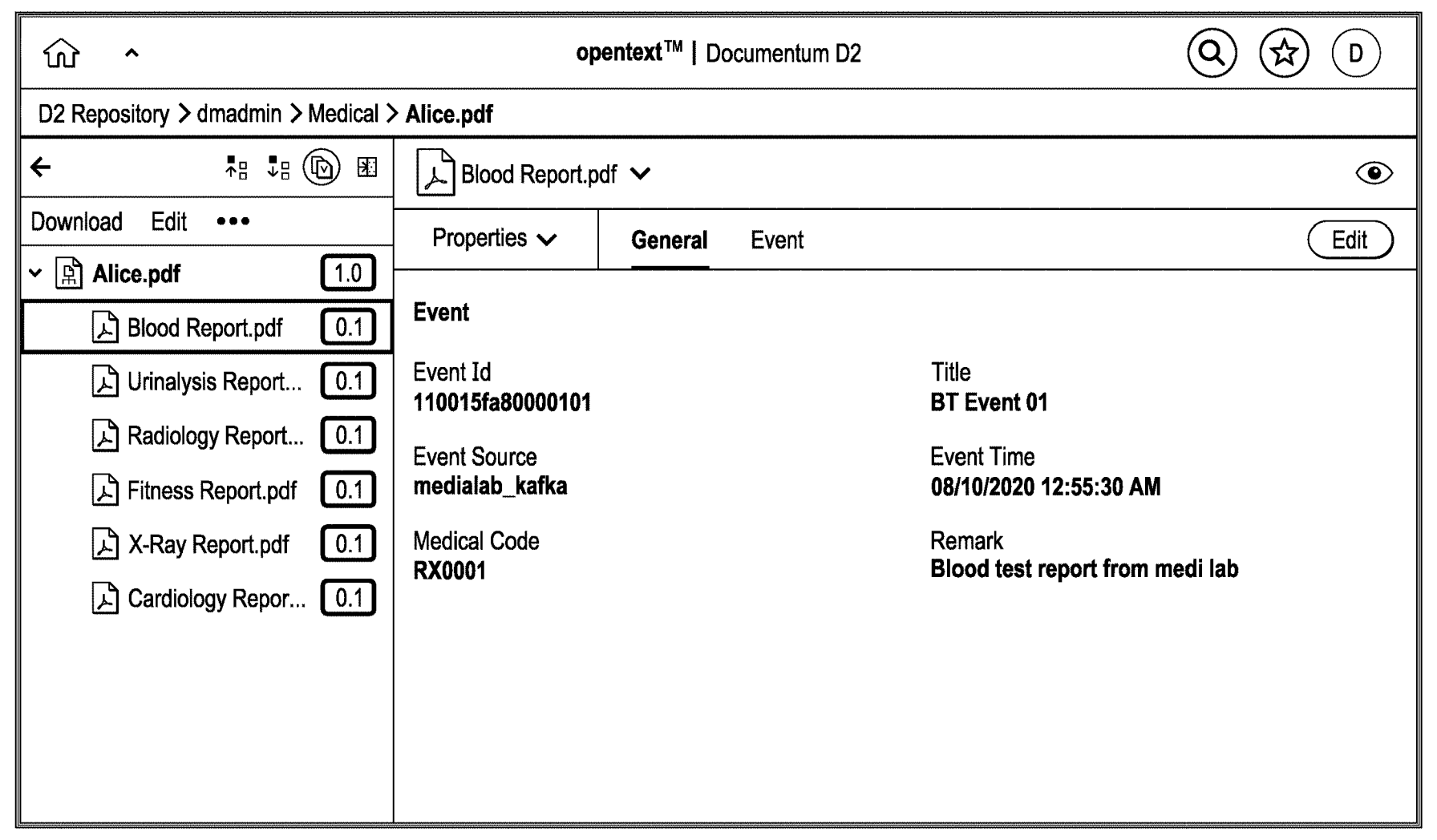
Figure 5B:
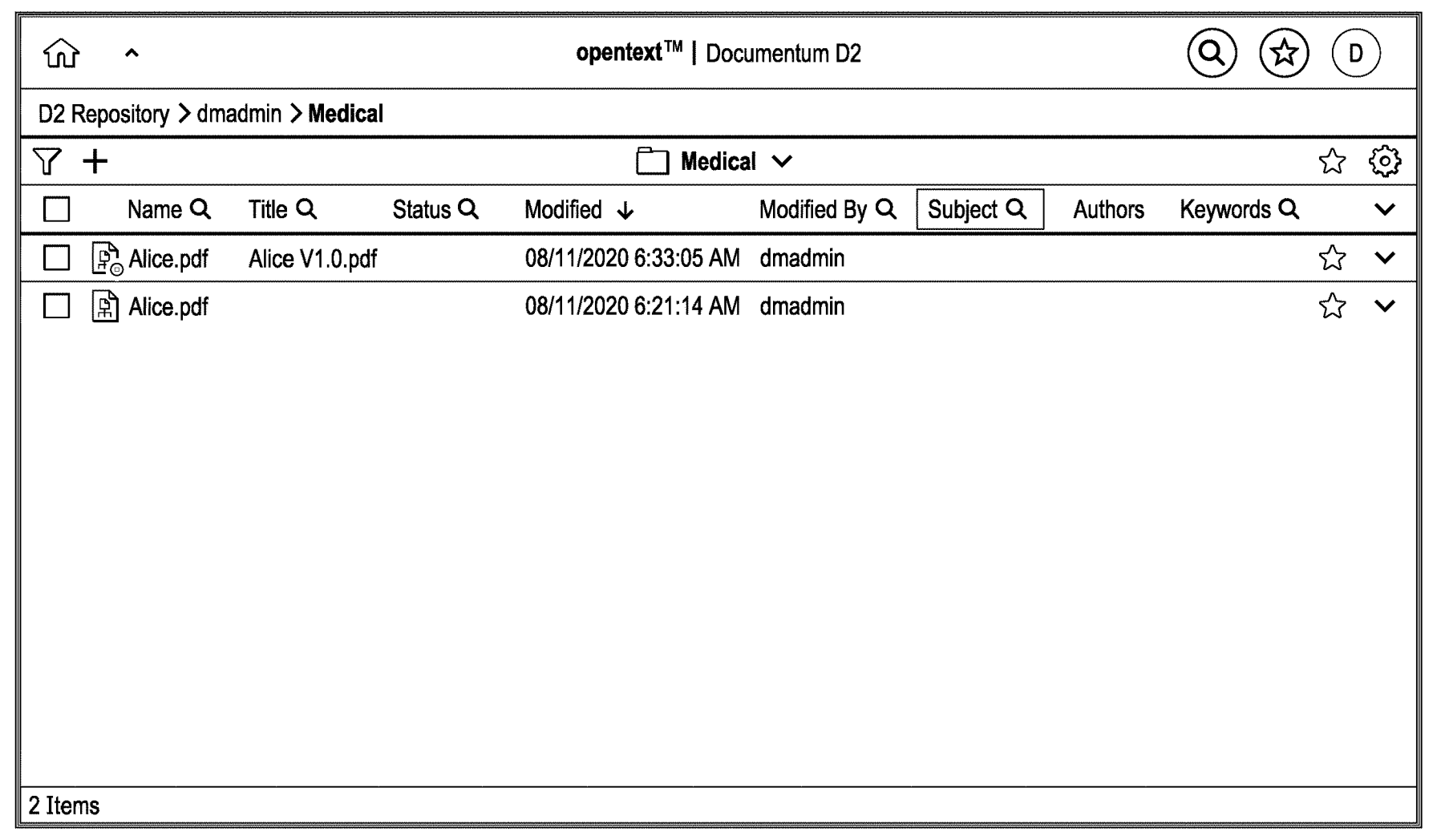
Figure 5F:
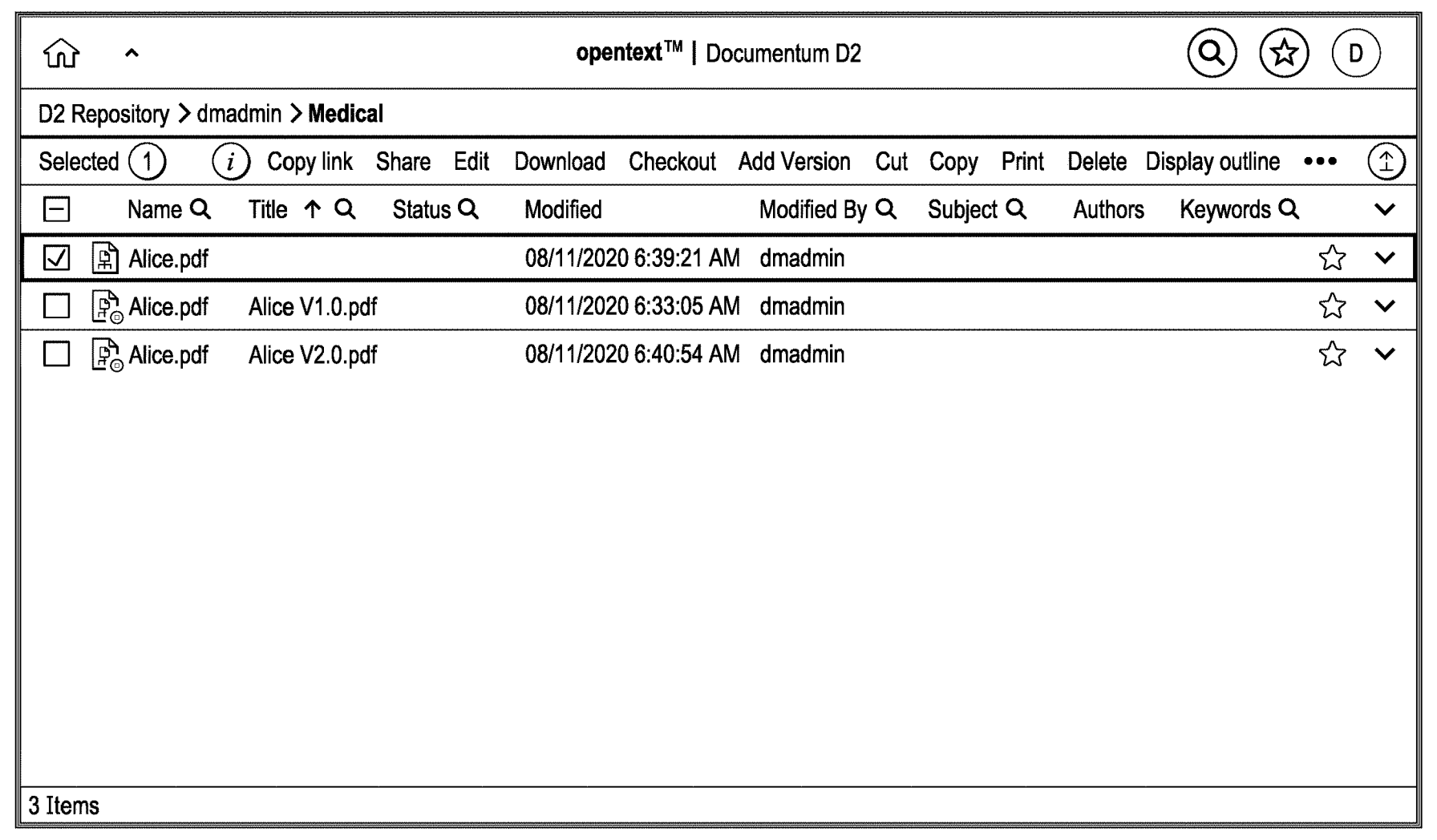

Moving on to FIGS. 5A-5I, examples of virtual documents and their associated data are depicted. Specifically, FIG. 5A depicts an initial state of a virtual document with Blood Report having v0.1 (e.g., version 0.1) created by event 110015fa80000101. FIG. 5B depicts a snapshot (e.g., of Alice V1.0) associated with event 110015fa80000101. FIG. 5C is an expanded view of the snapshot of FIG. 5B (e.g., snapshot of Alice V1.0) with event metadata. FIG. 5D depicts root document metadata. Specifically, event 110015fa80000101 stamped in the root document's event metadata. In FIG. 5E a new version is added to the virtual document by event associated with a second version of the Blood Report (v0.2) created by event 110015fa80000102. FIG. 5F depicts a snapshot (e.g., of Alice V2.0) associated with event 110015fa80000102. FIG. 5G is an expanded view of the snapshot of FIG. 5F (e.g., snapshot of Alice V2.0) with event metadata. FIG. 5H depicts root document metadata. Specifically, event 110015fa80000102 stamped in the root document's event metadata FIG. 5I depicts a snapshot of an older version of the virtual document (e.g., of Alice V1.0). The older version of the snapshot holds old data in the event metadata.

Figure 6:
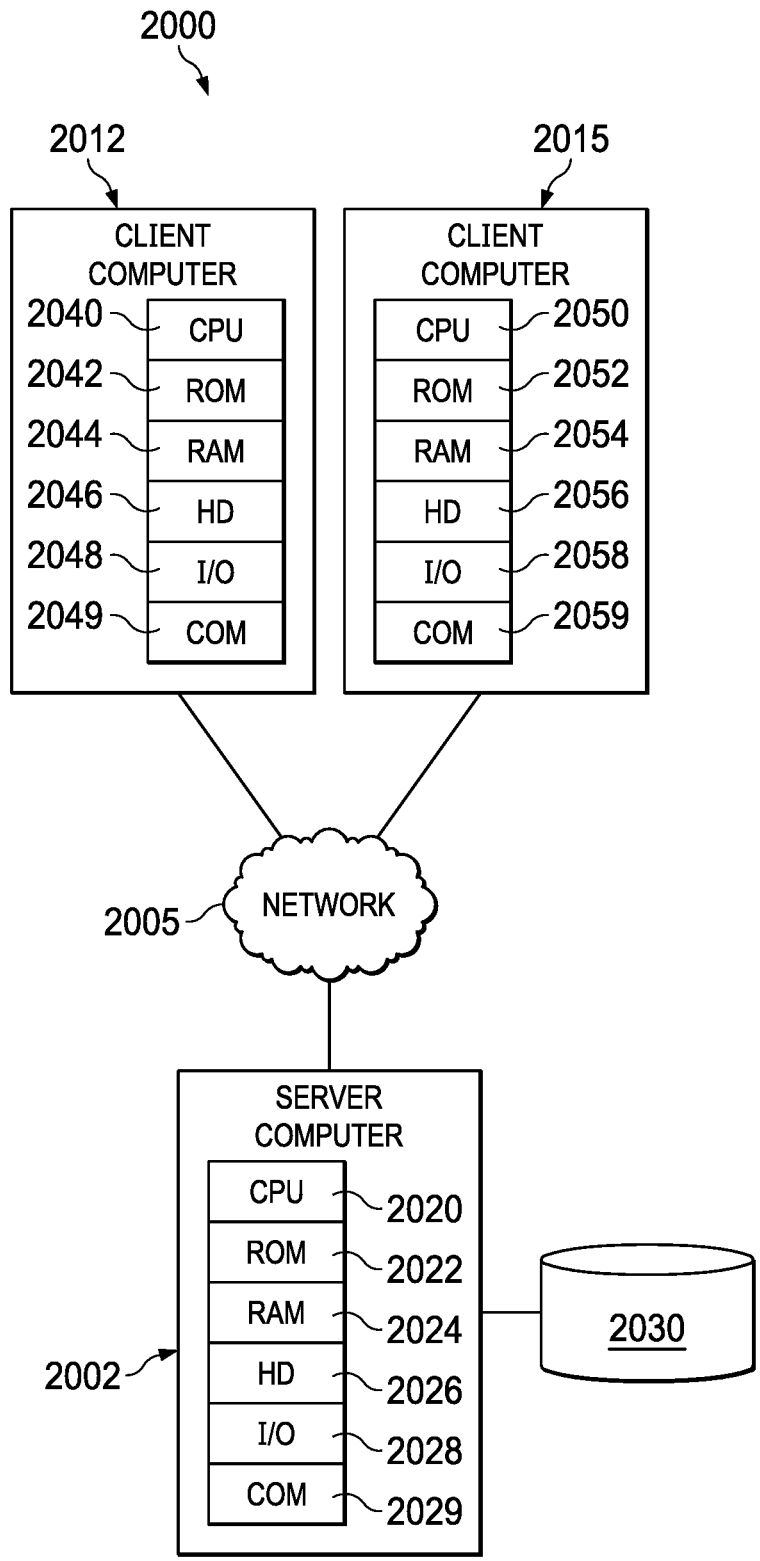
FIG. 6 depicts a diagrammatic representation of a distributed network computing environment.

FIG. 6 depicts a diagrammatic representation of a distributed network computing environment where embodiments disclosed herein can be implemented. In the example illustrated, network computing environment 2000 includes network 2005 that can be bi-directionally coupled to client computers 2012, 2015 and server computer 2002. Network 2005 may represent a combination of wired and wireless networks that network computing environment 2000 may utilize for various types of network communications known to those skilled in the art. For the purpose of illustration, a single system is shown for each of computer 2002, 2012, and 2015. However, each of computers 2002, 2012 and 2015 may comprise a plurality of computers (not shown) interconnected to each other over network 2005. For example, a plurality of computers 2002, a plurality of computers 2012 and a plurality of computers 2015 may be coupled to network 2005. Computers 2012, 2015 may include data processing systems for communicating with computer 2002.

Server computer 2002 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005. Computer 2002 may include one or more backend systems configured for providing a variety of services to computers 2012, 2015 over network 2005. These services may utilize data stored in data store 2030. According to one embodiment, server computer 2002 may include computer executable instructions stored on a non-transitory computer readable medium coupled to a processor. The computer executable instructions of server 2002 may be executable to provide a content management application (e.g., content management application 104) to provide a multitenant content management service that supports external users in user groups and manage an object data store in which folders and files are managed as objects.

Computer 2012 can comprise CPU 2040, ROM 2042, RAM 2044, HD 2046, I/O 2048 and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058 and communications interface 2059. According to one embodiment, client computers 2012, 2012 client applications (e.g., client applications 120) to interact with the content management application.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 2002, 2012 and 2015 is an example of a data processing system. ROM 2022, 2042, and 2052; RAM 2024, 2044, and 2054; HD 2026, 2046, and 2056; and data store 2030 can include media that can be read by CPU 2020, 2040, or 2050. These memories may be internal or external to computers 2002, 2012, or 2015.

Portions of the methods described herein may be implemented in suitable software code that may reside within ROM 2022, 2042, or 2052; RAM 2024, 2044, or 2054; or HD 2026, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A document management system, comprising:
    a schema registry including a schema definition of a schema of a type of virtual document, wherein the schema definition includes a virtual document identifier for a virtual document and a first document type and a second document type defining the schema of the type of virtual document;
    a data store comprising the virtual document, the virtual document including a first child document comprising a first document of the first document type and a second child document comprising a second document of the second document type;
    a non-transitory computer readable medium, comprising instructions for:
    a rules engine for:
        receiving an event having the virtual document identifier, an event identifier and a third document of the first document type;
        identifying the type of virtual document based on the event;
        identifying an event rule based on the type of virtual document or the first document type;
        evaluating the third document to generate an event code based on the event rule;
        sending the event code and the event to a snapshot engine;
    the snapshot engine for:
        receiving the event code and the event;
        storing the event data for the event in first metadata associated with the third document, wherein the event data includes the event identifier and the third document is stored as a new version of the first document of the virtual document;
        determining a snapshot rule associated with the event based on the event code, the first document type of the third document or the type of virtual document;
        evaluating the snapshot rule to determine that a snapshot should be created; and
        creating the snapshot of the virtual document, wherein creating the snapshot comprises locating a version of the second document based on the snapshot rule and storing the event data for the event in metadata associated with that version of the second document.

2. The document management system of claim 1, wherein the instructions are further for storing the event data in association with the third document.

3. The document management system of claim 1, wherein the version of the second document is a previous version of the second document.

4. The document management system of claim 1, wherein the previous version of the second document is associated with the event data.

5. The document management system of claim 1, wherein the snapshot rule specifies that only documents of the virtual document that are associated with the event data are to be captured in the snapshot.

6. The document management system of claim 5, wherein the virtual document includes a fourth document of a third document type that is not included in the snapshot of the virtual document.

7. The document management system of claim 1, wherein evaluating the third document comprises evaluating content of the third document and generating the event code based on the evaluation of the content of the third document.

8. The document management system of claim 1, wherein the event data is an identifier for the event.

9. A method, comprising:
providing a schema registry including a schema definition of a schema of a type of virtual document, wherein the schema definition includes a virtual document identifier for a virtual document and a first document type and a second document type defining the schema of the type of virtual document;
providing a data store comprising the virtual document, the virtual document including a first child document comprising a first document of the first document type and a second child document comprising a second document of the second document type;
receiving an event having the virtual document identifier, an event identifier and a third document of the first document type;
identifying the type of virtual document based on the event;
identifying an event rule based on the type of virtual document or the first document type;
evaluating the third document to generate an event code based on the event rule;
storing the event data for the event in first metadata associated with the third document, wherein the event data includes the event identifier and the third document is stored as a new version of the first document of the virtual document;
determining a snapshot rule associated with the event based on the event code, the first document type of the third document or the type of virtual document;
evaluating the snapshot rule to determine that a snapshot should be created; and
creating the snapshot of the virtual document, wherein creating the snapshot comprises locating a version of the second document based on the snapshot rule and storing the event data for the event in metadata associated with that version of the second document.

10. The method of claim 9, further comprising storing the event data in association with the third document.

11. The method of claim 9, wherein the version of the second document is a previous version of the second document.

12. The method of claim 9, wherein the previous version of the second document is associated with the event data.

13. The method of claim 9, wherein the snapshot rule specifies that only documents of the virtual document that are associated with the event data are to be captured in the snapshot.

14. The method of claim 13, wherein the virtual document includes a fourth document of a third document type that is not included in the snapshot of the virtual document.

15. The method of claim 9, wherein evaluating the third document comprises evaluating content of the third document and generating the event code based on the evaluation of the content of the third document.

16. The method of claim 9, wherein the event data is an identifier for the event.

17. A non-transitory computer readable medium, comprising instructions for:
providing a schema registry including a schema definition of a schema of a type of virtual document, wherein the schema definition includes a virtual document identifier for a virtual document and a first document type and a second document type defining the schema of the type of virtual document;
providing a data store comprising the virtual document, the virtual document including a first child document comprising a first document of the first document type and a second child document comprising a second document of the second document type;
receiving an event having the virtual document identifier, an event identifier and a third document of the first document type;
identifying the type of virtual document based on the event;
identifying an event rule based on the type of virtual document or the first document type;
evaluating the third document to generate an event code based on the event rule;
storing the event data for the event in first metadata associated with the third document, wherein the event data includes the event identifier and the third document is stored as a new version of the first document of the virtual document;
determining a snapshot rule associated with the event based on the event code, the first document type of the third document or the type of virtual document;
evaluating the snapshot rule to determine that a snapshot should be created; and
creating the snapshot of the virtual document, wherein creating the snapshot comprises locating a version of the second document based on the snapshot rule and storing the event data for the event in metadata associated with that version of the second document.

18. The non-transitory computer readable of claim 17, wherein the instructions are further for storing the event data in association with the third document.

19. The non-transitory computer readable of claim 17, wherein the version of the second document is a previous version of the second document.

20. The non-transitory computer readable of claim 17, wherein the previous version of the second document is associated with the event data.

21. The non-transitory computer readable of claim 17, wherein the snapshot rule specifies that only documents of the virtual document that are associated with the event data are to be captured in the snapshot.

22. The non-transitory computer readable of claim 21, wherein the virtual document includes a fourth document of a third document type that is not included in the snapshot of the virtual document.

23. The non-transitory computer readable of claim 17, wherein evaluating the third document comprises evaluating content of the third document and generating the event code based on the evaluation of the content of the third document.

24. The non-transitory computer readable of claim 17, wherein the event data is an identifier for the event.

* * * * *